US010859707B2

(12) United States Patent
Haddad et al.

(10) Patent No.: US 10,859,707 B2
(45) Date of Patent: Dec. 8, 2020

(54) METHOD FOR OPTIMALLY ADJUSTING GIVE ERROR BOUNDS OR FOR OPTIMALLY COMPUTING THE VARIANCES OF RESIDUALS OF IGP POINTS OF AN IONOSPHERIC GRID FOR CORRECTING AN SBAS SYSTEM AND SBAS SYSTEM FOR IMPLEMENTING SAID METHOD

(71) Applicant: THALES, Courbevoie (FR)

(72) Inventors: Franck Haddad, Toulouse (FR); Thierry Authie, Toulouse (FR); Sébastien Trilles, Toulouse (FR)

(73) Assignee: THALES, Courbevoie (FR)

( * ) Notice: Subject to any disclaimer, the term of this patent is extended or adjusted under 35 U.S.C. 154(b) by 330 days.

(21) Appl. No.: 15/833,949

(22) Filed: Dec. 6, 2017

(65) Prior Publication Data

US 2018/0188377 A1 Jul. 5, 2018

(30) Foreign Application Priority Data

Dec. 29, 2016 (FR) ...................... 16 01897

(51) Int. Cl.
*G01S 19/07* (2010.01)

(52) U.S. Cl.
CPC ............ *G01S 19/072* (2019.08); *G01S 19/07* (2013.01)

(58) Field of Classification Search
CPC ...... G01S 19/07; G01S 19/071; G01S 19/072; G01S 19/073; G01S 19/09
See application file for complete search history.

(56) References Cited

FOREIGN PATENT DOCUMENTS

WO 99/18677 A1 4/1999

OTHER PUBLICATIONS

R. Conker et al., "Description and Assessment of Real-Time Algorithms to Estimate the Ionospheric Error Bounds for WAAS," Navigation: Journal of the Institute of Navigation, vol. 44, No. 1, Jun. 1, 1997, pp. 77-88, XP056013253.
L. Sparks et al., "Kriging as a Means of Improving WAAS Availability," GNSS 2010 Proceedings of the 23rd International Technical Meeting of the Satellite Division of the Institute of Navigation (ION GNSS 2010), Sep. 24, 2010, pp. 2013-2020, XP056000308.
B. Wanner et al., "Wide Area Augmentation System Vertical Accuracy Assessment in Support of LPV200 Requirements," Navigation: Journal of the Institute of Navigation, vol. 55, No. 3, Dec. 1, 2008, pp. 191-203, XP056013532.

*Primary Examiner* — Dao L Phan
(74) *Attorney, Agent, or Firm* — BakerHostetler

(57) ABSTRACT

A method for optimally fitting GIVE ionospheric correction error bounds and/or a method for computing variances of residuals of IGP points of an ionospheric grid for correcting an SBAS system each comprise a step of inverse interpolation implemented on a set of observation pierce points IPPi. In the method for optimally fitting the GIVEs, the step of inverse interpolation scatters for each observation pierce point IPPi concerned a variance increment $\Delta_{UIVE_i}^2$ over the IGP points of the mesh cell of the IPPi by using a least squares scheme. In the computation of the variances of residuals, the step of inverse interpolation scatters for each observation pierce point IPPi concerned a residual $Res^2$ over the IGP points of the mesh cell of the IPPi by using a least squares scheme.

15 Claims, 12 Drawing Sheets

METHOD FOR OPTIMALLY ADJUSTING GIVE ERROR BOUNDS OR FOR OPTIMALLY COMPUTING THE VARIANCES OF RESIDUALS OF IGP POINTS OF AN IONOSPHERIC GRID FOR CORRECTING AN SBAS SYSTEM AND SBAS SYSTEM FOR IMPLEMENTING SAID METHOD

CROSS-REFERENCE TO RELATED APPLICATIONS

This application claims priority to foreign French patent application No. FR 1601897, filed on Dec. 29, 2016, the disclosure of which is incorporated by reference in its entirety.

FIELD OF THE INVENTION

The present invention relates to a first method for optimally fitting error bounds in respect of estimations of ionospheric delays, called GIVE (standing for "Grid Ionospheric Vertical Error"), participating in ensuring the integrity of the critical ("Safety of Life") aeronautical navigation services, which is provided by a space augmentation system ("Satellite Based Augmentation System"). These corrections as well as their associated error bounds are calculated for points, called IGPs, of an ionospheric correction grid for the SBAS system.

The invention also relates to a second method for optimally computing the standard deviations called $\sigma_{MOPS}$, making it possible to model the error of interpolation, carried out between the IGPs and the pierce point of the signal received by the user, and the error of the rabattement function for mapping the vertical delay to the slant delay, the said standard deviations $\sigma_{MOPS}$ being involved in the computation of the final GIVEs, and being associated with the ionospheric error corrections calculated for IGP points of an ionospheric grid for correcting an SBAS system to ensure the integrity of a GNSS service.

The invention also relates to an SBAS satellite(s)-based augmentation system configured for the implementation of the first method and/or of the second method of the invention.

BACKGROUND

An SBAS satellite(s)-based augmentation system, for example the EGNOS (European Geostationary Navigation Overlay Service) system, is a system intended to augment the performance of a global navigation satellite system GNSS, for example the GPS system (standing for "Global Positioning System"), by providing improved precision and by guaranteeing an integrity level rendering the use of the GPS system compatible with aerial operations.

In a known manner, the corrections and the error bounds associated with this use are calculated by computation centres, forming part of the SBAS system and using data recovered on the basis of GNSS receivers or of specific stations deployed in an optimized manner in the service area to be augmented, these stations being called RIMS stations (standing for "Ranging and Integrity Monitoring Station") in the case of a system of EGNOS type (standing for "European Geostationary Navigation Overlay Services").

The SBAS system calculates corrections making it possible to compensate for the main sources of error of the GPS positioning, namely:

the correction of the orbit and of the clock of the augmented satellites;

and also the correction of the ionospheric error related to the delay of the GPS signal caused by the said signal's crossing through the ionosphere.

The set of corrections and of their associated error bounds are dispatched to the users, more precisely the GNSS receivers embedded on board the user terminals, by way of geostationary satellites emitting standardized signals which will be able thereafter, to be decoded and used by users equipped for SBAS augmentation. Generally, a user equipped for SBAS augmentation has a specific GPS receiver, capable of tracking and decoding the messages of the SBAS geostationary satellites, in accordance with the norms defined by the applicable RTCA-DO229 standard, all versions up to and including the current version E, and the ICAO SARPs standard, all versions up to and including the current 6th version.

Concerning the clock errors and orbit errors, the ephemerides received directly through the GPS signals are generally of very good quality and do not necessarily require correction. Above all, however, it is the guaranteed integrity in regard to these data which does not suffice for civil aviation. The SBAS system must therefore observe, correct and above all guarantee with the integrity level required, the orbit information and clock information which will be dispatched to the end users. The SBAS system therefore has in particular the capacity to detect the errors and to repair them, or if this does not turn out to be possible, to warn the user in a sufficiently short time of the existence of these unrepaired errors, so as to guarantee their safety.

Concerning the ionospheric delay, the problem is quite another. Indeed, uncorrected, these errors may amount to several tens of metres in the GPS positioning error. Although the signals dispatched by the GPS satellites contain a model for correcting these delays as a function of the time and of the position of the pierce points IPP (Ionospheric Pierce Point) of the signals received by the user, this model turns out to be rather unreliable, in particular when the electromagnetic activity of the ionosphere is strong and unstable, especially in the equatorial or polar areas. This model, bearing the name of its inventor Klobuchar, can therefore serve to guarantee integrity only for aerial operations requiring only little precision. For precise approaches the said procedures conventionally being referred to in English as "Non Precision Approach/En route" with a view to the landing of an aircraft, this model is therefore insufficient having regard to the precision level required.

The SBAS system must therefore calculate an estimation of these delays above the area of coverage by defining a more precise and current model of the electron content of the ionosphere in terms of GNSS signal delay when crossing the ionosphere. This model, more precise and representative in real time of the ionospheric delays, is achieved through a virtual discrete mesh or network of points called IGPs (standing for "Ionospheric Grid Points"), situated at an altitude of 350 km, the ionosphere being regarded as a thin layer concentrating most of its electron density at this altitude.

These crossing delays computed on the IGPs are established for vertical signals, and are interpolated in a standardized manner by the user terminal as a function of the location of its IPPs with respect to the various IGP points of the mesh. A rabattement mapping function, also standardized, is thereafter used as a function of the elevation with respect to the terrestrial sphere of the various lines of sight of the satellites visible from the GNSS antenna of the user terminal to ensure the lengthening of the delay as a function of the slant of the signals tracked.

The delays and their error bound on each of the mesh's IGP points observable by the SBAS system are computed on the basis of the dual-frequency measurements collected by the integrity control and telemetry stations distributed over the whole of the area of coverage of the SBAS system, the said stations being referred to as RIMS in the case of the EGNOS system and as WRS (standing for "Wide-area Reference Station") in the case of the WAAS system (standing for "Wide area Augmentation System") for example.

A dedicated algorithm carries out the estimation of the delays and provides a first simplified error bound called the "Basic GIVE" (standing for "Basic Grid Ionospheric Vertical Error"). A certain number of terms are thereafter computed and added so as to confer on the final error bound ensuring integrity, referred to as the GIVE (standing for "Grid Ionospheric Vertical Error"), the required confidence in order to comply with safety relating to precise aerial operations.

In accordance with the standard of the GPS system, the GIVE is determined according to the expression:

$$GIVE = 3.29 \times \sigma_{GIVE}$$

in which $\sigma_{GIVE}^2$ designates a corrected variance of the variance provided by the GIVD estimator filter and designated by $\sigma_{BASIC\_GIVE}^2$.

Here and according to an exemplary dedicated algorithm, the corrected variance $\sigma_{GIVE}^2$ is computed according to the expression:

$$\sigma_{GIVE}^2 = \sigma_{BASIC_{GIVE}}^2 + \sigma_{MOPS}^2 + \sigma_{GEOMETRY_{SCALE}}^1 + \sigma_{USER_{SMOOTHING}}^2 + \sigma_{DRIFT}^2$$

in which $\sigma_{BASIC_{GIVE}}^2$ is the variance provided by the GIVD estimator filter, $\sigma_{MOPS}^2$ is the variance of the residuals which are obtained through the difference between the UISD estimated on the basis of the IGPs with the interpolation scheme of the MOPS system, and the STEC ("Slant Total Electron Content") obtained directly for the measurement point of the station considered, $\sigma_{GEOMETRY_{SCALE}}^2$ is a variance representative of the quality of the observation of the sky around the IGP to be estimated, $\sigma_{USER_{SMOOTHING}}^2$ is a variance for protecting the users against a bias generated by the filtering of their measurements in the presence of gradient in the ionospheric delay, $\sigma_{DRIFT}^2$ is a variance which makes it possible to ensure that the protection offered by the GIVE is maintained until the next refresh of the latter.

Once the final GIVE has been calculated for each IGP, it is again verified that when the ionospheric corrections are applied to the various IPPs measured by the RIMS stations that are compared with respect to the value measured directly at their level, the differences between the ionospheric delay value measured at the IPP and the value reconstructed by interpolation are correctly covered by their associated UIVE (User Ionospheric Vertical Error), resulting from the interpolation (according to the interpolation scheme imposed by the standard) of the GIVEs of the IGPs situated around the IPPs considered. It is on this precise point that the first method of the invention concentrates.

Before describing the current method for verifying integrity of the correction information associated with the IGPs, preliminary definitions and illustrations of a certain number of quantities used by the said current method are described hereinbelow.

According to FIG. 1 a pierce point IPP, designated by the numerical reference 2, corresponds to the intersection of a line of sight 4. LoS between a GNSS satellite 8, here a GPS satellite, and a user receiver 10 with the ionosphere 12, regarded as an infinitely thin layer 14 by the RTCA-DO229 standard, all versions up to and including the current version E, and the ICAO SARPs standard, and situated at an altitude of 350 km. The user receiver 108, here embedded aboard an aircraft, and the GPS satellite 8 form part of a GNSS system 14.

In the same way that a user receiver possesses at a given instant an IPP per line of sight of the or of each of the GNSS satellites within visibility, according to FIG. 2 each RIMS observation station 22 of an SBAS system 24 possesses a given number of IPPs measured over a given time window. Here, in FIG. 2, a single observation pierce point IPP 26 at a given instant is represented as the intersection of a line of sight 28 between a GPS satellite 30 and a receiver terminal 32 of an observation station 34, forming part of the set of observation stations 22 of the SBAS system 24, with the ionosphere 12, regarded as the infinitely thin layer 14.

The measurements provided by the RIMS observation stations 22 being dual frequency at the frequencies L1 (C/A) and L2 (P(Y)), in contradistinction to the user terminals which currently have only the frequency L1 (C/A) for civil uses, the ionospheric delay at each of the observation IPPs can be computed on the basis of the difference made in the "pseudo-distances", designated respectively by C1 and P2, between L1 and L2, after deduction by estimation of the inter-frequency biases generated by the GPS receiver terminal 32 of the RIMS 34 of FIG. 2, and by the satellite 30 also. At the level of the satellite 30, the bias corresponds to a transmission bias between the signals of different frequencies. At the receiver level, it entails a bias caused by the processing chain of the receiver terminal between each frequency.

The measurement of the ionospheric delay by this scheme rests on the fact that the speed of propagation of an electromagnetic signal such as the GPS signal in the ionosphere depends on its frequency, here denoted f. More precisely, the ionospheric delay, here denoted d, is to first order proportional to the electron content of the path scanned STEC (standing for "Slant Total Electronic Content") and inversely proportional to the square of the frequency, and this may be formulated by the expression:

$$d \sim \frac{STEC}{f^2}.$$

For information, the frequency L2 is used only partially by the SBAS system which merely tracks the signal in itself, since the content of the signal carried by this frequency L2 is exclusively for military use and therefore inaccessible for civil uses on account of powerful encryption schemes which are introduced thereinto. However, for the measurement of the ionospheric delay, this use is amply sufficient.

For their part, civil aircraft are not equipped with receivers capable of tracking L2 if only partially on account of the absence of any standard framing its use, and above all on account of the fact that L2 is not a civil frequency at base.

Thus the difference of the pseudo-distances is governed by the relation:

$$P2 - C1 = (\gamma - 1) \times STEC + IFB^{satellite} + IFB_{station} \quad \text{(equation \#1)}$$

with:

$$\gamma = \frac{f_{L1}^2}{f_{L2}^2},$$

the ratio of the frequencies L1 and L2 making it possible to refer the ionospheric delay to the reference frequency L1;

STEC, the ionospheric delay of the real line of sight, therefore dependent on the elevation (known as Slant TEC, with TEC "Total Electron Content");

IFB$^{satellite}$ and IFB$_{station}$ are respectively the inter-frequency biases of the satellite and of the receiver.

This computation is repeated for all the lines of sight of each RIMS deployed throughout the service area of the SBAS system. Thus a significant number of IPP of measurements is obtained, situated in the vicinity and in neighbourhoods of all the points, on which the STEC is measured, of an IGP mesh that are observable in the service area.

Next, each ionospheric delay of the real line of sight STEC is "rectified" to the vertical by becoming a VTEC (V for vertical) according to a relation of the type:

$$STEC = F_{pp} \cdot VTEC \qquad \text{(equation \#2)}$$

in which $F_{pp}$ designates a rabattement function for mapping the ionospheric delay as a function of the elevation of the line of sight.

It may be noted here that this factor equals 1 when the elevation of the line of sight is 90°, therefore vertical. At this step of the computation, the choice of the rabattement law is free. Therefore, the rabattement law defined in the standard for a user terminal within the framework of the navigation service is not necessarily used. It is possible to define the law that is judged to be the most effective and the most suitable for obtaining the best possible GIVD.

Thereafter, an algorithm is used to compute an estimated ionospheric delay on each IGP, then called the vertical delay of the ionospheric meshed network or GIVD (standing for "Grid Ionosphere Vertical Delay").

According to FIG. 3, an exemplary collection of measurements, performed by one or more RIMS station, into a set or cloud of IPP points contained in an area of influence or neighborhood 42 of a predetermined IGP of an ionospheric meshed network 44, is illustrated. Here, the mesh illustrated is a mesh of IGP points which is defined by the RTCA-DO229 standard, all versions up to and including the current version E, and the ICAO SARPs standard, with mesh cells of square shape. In this example, the IGP point 46 whose area of influence 42 is illustrated is surrounded by eight immediately neighbouring IGP points 48, 50, 52, 54, 46, 58, 60, 62 and forms the common point of four adjacent mesh cells 64, 66, 66, 68 which surround it and constitute the essence of its area of influence 42. The IPP observation points, represented by stars and situated in the area of influence 42 defined by a setting in the algorithm, carry and are each associated with a measurement of VTEC. Thus, each IPP situated in this area of influence contributes to the calculation of the GIVD of the IGP considered with weights varying according to the quality of their measurement and their distance with respect to the IGP concerned.

This same operation is repeated on all the IGPs of the service area of the SBAS having sufficient IPP in their area of influence to correctly estimate a value of GIVD and a standard deviation called Basic GIVE or starting GIVE.

Once the GIVDs have been obtained for each of the IGPs of the SBAS service area, according to FIG. 4, the UIVD (standing for "User Ionospheric Vertical Delay") is computed on each IPP situated in the facets or cells or mesh cells containing the IPP that it is sought to evaluate, for example the IPP 76, by interpolating the GIVD of the four IGPs, here designated by 78, 80, 82, 84, defining the facet in which the interpolation can be carried out.

It is recalled that the standard of the SBAS used imposes the interpolation law which uses a bilinear transformation scheme, weighted as a function of the distance of the IGPs involved with respect to the IPP.

Thus, the UIVD obtained for the IPP considered makes it possible to observe the deviation obtained between the delay arising directly from the measurement on the IPP and the UIVD arising from the estimation of the GIVD of the neighbouring IGPs and their interpolation. Once the UIVD has been obtained, it is mapped over with the rabattement function defined in the standard to obtain the UISD:

$$UISD = F_{pp\ standard} \cdot UIVD \qquad \text{(equation \#3)}$$

Indeed, here the same conditions as are experienced by a user are considered and it is desired to determine the errors which will be generated by the use of the standardized interpolation law and the standardized rabattement function.

For the GIVE ionospheric error bounds and according to FIG. 5, exactly the same scheme is applied. Once interpolated at the level of the IPP 76, the GIVE becomes UIVE (standing for User Ionospheric Vertical Error).

Thereafter, just as for the UIVD, the UIVE is mapped according to the elevation of the line of sight associated with the IPP considered so as to obtain the UISE (standing for User Ionospheric Slanted Error):

$$UISE = F_{pp\ standard} \cdot UIVE \qquad \text{(equation \#4)}$$

For the verification of the integrity guaranteed at the user level, the delays and the bounds are computed in their vertical rather than mapped form. The rabattement error will be integrated into the measurement of the IPP during its conversion from STEC to VTEC.

According to the current integrity verification scheme, it is verified whether the GIVE of each IGP does indeed suffice to bound the error measured on the basis of each IPP collected by an RIMS station and having inherited its UIVD and UIVE pair, obtained by interpolation of the GIVDs and GIVEs of the IGPs constituting the cell in which the interpolation at the IPP was carried out.

Accordingly, a current IGP having been chosen from among the set of IGPs to be scanned, here the IGP designated by the numerical reference 92, and according to FIG. 6, we consider the set of IPPs attached to at least one cell containing the IGP considered in their interpolation.

In FIG. 6, the set 94 of the observation IPPs which will be used for the verification of the GIVE integrity ensured by the GIVE of the tested IGP lie inside the four cells 96, 98, 100, 102 represented. One of the IPPs is moreover shown with its measured VTEC. It will serve hereinafter as example in the application of the integrity control scheme.

For each IPP, the deviation is computed between the vertical ionospheric delay value interpolated at its level, that is to say the UIVD and the value of vertical delay measured directly VTEC on this IPP.

It is recalled that the VTEC is obtained on the basis of the measured STEC, which is multiplied by the inverse of the rabattement function:

$$VTEC_i = \frac{STEC_i}{F_{pp\;standard}} \quad \text{(equation \#6)}$$

It is then verified that the measured error is indeed covered by the UIVE with the integrity level required, that is to say for example $10^{-7}$, this corresponding to 5.33 σ for a Gaussian distribution, for each IPPi, i designating a scan index for traversing the IPPs contained in the cells, defined beforehand, immediately neighbouring the tested IGP.

The UIVE is interpreted in the standard as a variance with a confidence level referred to 99.9%, that is to say the square of 3.29σ. In our case, we consider a standard deviation, therefore 1σ. We shall therefore call it: $\sigma_{UIVE}$.

Firstly, an innovation of each IPPi designated by stdUIVDerror$_i$, is computed according to the expression:

$$stdUIVDerror_i = \frac{|VTEC_i - UIVD_i|}{\sqrt{\sigma^2_{VTEC_i} + \sigma^2_{UIVE_i}}} \quad \text{(equation \#7)}$$

with:
VTEC$_i$, the vertical ionospheric delay measured at the IPP i,
UIVD$_i$, the vertical ionospheric delay interpolated on the basis of the GIVDs of the IGPs surrounding the IPP i;
$\sigma_{VTEC_i}$, the standard deviation of the measurement noise at the IPP
$\sigma_{UIVE_i}$, the standard deviation arising from the GIVEs of the IGPs having participated in the interpolation of the UIVD of the IPPi concerned.

It should be noted that the values C1 and P2 serving for the calculation of the measurement of VTECi at the IPPi are noisy and generally filtered upstream. It is therefore necessary to take the residual noise into account in order to limit false alarms.

The set of computed innovations is examined to see whether the maximum value of the obtained exceeds the predetermined threshold value 5.33 which corresponds to the integrity level of $10^{-7}$:

stdUIVDerror$_i$≥5.33

If the innovation is greater than the permitted threshold, then a trial of refitting of the GIVE of the tested IGP is undertaken by inflating the first ratio $$\frac{stdUIVDerror_i}{5.33}$$

by a refitting factor, for example here equal to 1.1 when a 10% margin is desired, so as to obtain a second "inflated" ratio, designated by K and expressed as:

$$K = \frac{stdUIVDerror_i}{5.33} \times 1.1$$

The variance of the refitted GIVE, designated by a $\sigma_{GIVE}$(K), may therefore be written:

$$\sigma_{GIVE}(K) = K \cdot \sigma_{GIVE}$$

However, the main limitation of this operation resides in the fact that it does not ensure a perfectly fitted correction since here no account is taken of the other IGPs that served in obtaining the UIVDi of the IPPi considered.

In order to avoid any risk of non-compliance with the integrity level, when the condition stdUIVDerror$_i$>5.33 is realized, condition associated here with the integrity level of 99.99999%, i.e. a risk of $10^{-7}$, then the use of the IGP considered is barred without trying to correct its GIVE.

This has the consequence of potentially reducing the capacity of a user terminal to use the whole set of satellites that are visible to it to carry out, in the case of an aircraft, its approach towards the landing runway and therefore of increasing the risk of preventing the user terminal from attaining the service level necessary in order to perform a predetermined task, a precise approach in the case of an aircraft.

Moreover, if this prevention occurs during a precise approach in the case of an aircraft, the latter will then have no choice but to stop its approach. The aircraft then performs a go-around, distances itself from the runway and places itself on standby above the airport while waiting for the control tower to offer it another approach procedure, for example a so-called "non-precise" approach. This could lead to more complex management of the air traffic above the impacted area.

SUMMARY OF THE INVENTION

A first invention is aimed at remedying the drawbacks described hereinabove.

The first technical problem that the first invention solves is to propose a method for optimally fitting the GIVE error bounds of IGP points of an ionospheric correction grid for a service area of an SBAS system, and a system for implementing the said method, which guarantee at one and the same time adherence to the integrity requirement of a predetermined SBAS service and the use of a maximum number of IGP having their GIVE fitted for better availability of the SBAS service.

For this purpose, the invention has as first subject a method for optimally fitting error bounds of GIVE correction of a first set of IGP points of an ionospheric correction grid for a service area of a satellite-based augmentation system SBAS, the ionospheric correction grid being structured as a meshed network of cells of predetermined polygonal shape, the cells of the meshed network corresponding projectively to the SBAS service area and having as vertices IGP points of the first set. The method for optimally fitting the error bounds comprises the steps consisting in:

computing with at least one electronic computer, on the basis of predetermined information in respect of ionospheric error corrections of the IGP points of the first set, and of measurements of pseudo-distances of a second set of control and observation pierce points IPP which are contained in the cells of the ionospheric grid, for each observation pierce point IPPi of the second set, an innovation designated by stdUIVDerror$_i$, according to the expression:

$$stdUIVDerror_i = \frac{|VTEC_i - UIVD_i|}{\sqrt{\sigma^2_{VTEC_i} + \sigma^2_{UIVE_i}}}$$

in which:
VTEC$_i$ designates the vertical ionospheric delay measured at the IPPi,
UIVD$_i$ designates the vertical ionospheric delay interpolated on the basis of the GIVDj of the IGPj of the mesh cell of rank m surrounding the IPPi concerned;

$\sigma_{VTEC_i}$ designates the standard deviation of the measurement noise at the IPPi, $\sigma_{UIVE_i}$ designates the standard deviation arising from the GIVEs of the IGPj of the mesh cell of rank m having participated in the interpolation of the UIVDi of the IPPi concerned; and then when the innovation of the IPPi scanned in the current mesh cell of rank m is strictly greater than a theoretical threshold MaxThd corresponding to predetermined confidence and integrity level required by the SBAS service, computing a variance increment $\Delta_{UIVE_i}^2$ that would need to be added to the $\sigma_{UIVE_i}^2$ on the IPPi considered in order for it to cover the integrity level required according to the equation:

$$\Delta_{UIVE_i}^2 = (\beta + \sigma_{UIVE_i}^2) \times (K_{fact}^2 - 1)$$

in which:

$\sigma_{UIVE_i}$ designates the standard deviation arising from the GIVEs of the IGPj of the mesh cell of rank m having participated in the interpolation of the UIVDi of the IPPi concerned;

$\beta$ and $K_{fact}^2$ designate respectively a first term and a second term, the first term $\beta$ being determined according to the equation:

$$\beta = \sigma_{VTEC_i}^2$$

where $VTEC_i$ designates the vertical ionospheric delay measured at the IPPi considered, and the second term $K_{fact}^2$ being determined according to the equation:

$$K_{fact}^2 = \frac{stdUIVDerror_i^2}{(SafMarg \times MaxThd)^2}$$

SafMarg designating the integrity margin as a percentage of the tolerated maximum threshold that one wishes to generate, greater than 0 and strictly less than 1, and configured as a function of an integrity guarantee margin as a predetermined relative value, denoted X and expressed as a percentage, according to the expression:

$$SafMarg = (1-X).$$

The method of optimal fitting is characterized in that it furthermore comprises the steps consisting in, when the innovation of the IPPi scanned in the current mesh cell of rank m is strictly greater than a theoretical threshold MaxThd:

determining values of variance increments $\Delta_{GIVE_k}^2$ to be allocated respectively to the IGPk of the mesh cell of the IPPi considered by an inverse interpolation scheme using a Least Squares scheme so as to distribute the variance increment $\Delta_{UIVE_i}^2$ of the IPPi according to the relation:

$$\Delta_{UIVE_i}^2 = \sum_{k=1}^{N_{IGP}} w_k \cdot \Delta_{GIVE_k}^2$$

in which $N_{IGP}$ is the number of IGPs of the mesh cell of predetermined shape that are used in the computation of the UIVDi and UIVEi of the IPPi considered;

k designates a numbering index in the mesh cell containing the IPPi of the IGPs of the said mesh cell, $w_k$ designate the respective weights of the IGPk, k varying from 1 to $N_{IGP}$, computed by applying the GNSS standard according to a function of the GNSS standard which depends on the distance between the IPPi and the IGPk, the sum of the weights $w_k$ being equal to one; and then for each IGPk of the mesh cell m to which the IPPi considered belongs, updating the variance $\sigma_{GIVE_k}$ of the said IGPk by replacing the current value $\sigma_{GIVE_k}$ of the GIVEk with a new value equal to $\sqrt{\sigma_{GIVE_k}^2 + \Delta_{GIVE_k}^2}$.

According to particular embodiments, the method for optimally fitting the GIVE ionospheric correction error bounds comprises one or more of the following characteristics:

the step of determining the values of variance increments $\Delta_{GIVE_k}^2$ to be allocated respectively to the IGPk of the mesh cell of the IPPi considered is implemented by a Conventional Least Squares scheme in which a vector Yi of distribution of the $\Delta_{UIVE_i}^2$ of the IPPi considered over the associated IGPk is computed according to the equation: $Yi = Hi^t \cdot (Hi \cdot Hi^t)^{-1} \cdot \Delta_{UIVE_i}^2$ in which:

$Hi = [w_1 \ w_2 \ \ldots \ w_{NIGP}]$ designates a row vector with $N_{IGP}$ components for carrying out the interpolation of the IPPi considered, each component $w_k$, k varying from 1 to $N_{IGP}$, corresponding to the weight of an $IGP_k$ obtained with the direct interpolation computation scheme defined by the standard for the IPPi considered;

$$*Yi = \begin{bmatrix} \Delta_{GIVE_1^2} \\ \Delta_{GIVE_2^2} \\ \ldots \\ \Delta_{GIVE_{NIGP}^2} \end{bmatrix}$$

designates a column vector with $N_{IGP}$ components of the distribution of the variance increment $\Delta_{UIVE_i}^2$ to be distributed over the $N_{IGP}$ IGPk when the mesh cell of the IPPi considered comprises $N_{IGP}$ IGPs, as result of solving the equation;

$\Delta_{UIVE_i}^2$ designates the variance increment to be distributed;

the step of determining the values of variance increments $\Delta_{GIVE_k}^2$ to be allocated respectively to the IGPk of the mesh cell of the IPPi considered is implemented by a least squares scheme adjusted through a confidence level 1-p in which a vector Yi of distribution of the $\Delta_{UIVE_i}^2$ of the IPPi considered over the associated IGPk is computed according to the equation: $Yi = T_i^{CALSQ} \cdot Hi^t \cdot (Hi \cdot Hi^t)^{-1} \cdot \Delta_{UIVE_i}^2$ in which:

$$*Yi = \begin{bmatrix} \Delta_{GIVE_1^2} \\ \Delta_{GIVE_2^2} \\ \ldots \\ \Delta_{GIVE_{NIGP}^2} \end{bmatrix}$$

designates a column vector with $N_{IGP}$ components of the distribution of the variance increment $\Delta_{UIVE_i}^2$ to be distributed over the $N_{IGP}$ IGPk when the mesh cell of the IPPi considered comprises $N_{IGP}$ IGP, as result of solving the equation;

$Hi = [w_1 \ w_2 \ \ldots \ w_{NIGP}]$ designates a row vector with $N_{IGP}$ components for carrying out the interpolation of the IPPi considered, each component $w_k$, k varying from 1 to $N_{IGP}$, corresponding to the weight of an $IGP_k$ obtained with the direct interpolation computation scheme defined by the standard for the IPPi considered; and $T_i^{CALSQ}$ is a square inflation matrix of rank $N_{IGP}$, defined by:

$$T_i^{CALSQ} = \frac{1}{G(p)^2} \begin{bmatrix} t_{v_1,\alpha}^2 & 0 & \ldots & 0 \\ 0 & t_{v_2,\alpha}^2 & \ldots & 0 \\ \ldots & \ldots & \ldots & \ldots \\ 0 & 0 & \ldots & t_{v_4,\alpha}^2 \end{bmatrix}$$

with $t_{v_k,\alpha}$ designating the associated Student's factor the IGPk of rank k dependent on $v_k$ the degree of freedom and dependent on the confidence probability $\alpha$, the said Student's factor $t_{v_k,\alpha}$ making it possible to bound an error with a predetermined confidence level (1-p) required by the SBAS service, the confidence probability $\alpha$ being related to the confidence level by the relation $$\alpha = 1 - \frac{1}{2} \cdot p,$$

and the degree of freedom $v_k$ being equal here to the number of IPP having generated a residual for the IGPk concerned minus one; and G(p) designating the value obtained when the Gaussian assumption is applied for the same confidence probability (1-p) as that used for the computation of $\alpha$, that is to say the limit of the Student's factor $t_{v_k,\alpha}$ when the degree of freedom $v_k$ tends to infinity; and $\Delta_{UIVE_i}^2$ designates the variance increment to be distributed;

the step of determining the values of variance increments $\Delta_{GIVE_k}^2$ to be allocated respectively to the IGPk of the mesh cell of the IPPi considered is implemented by a least squares scheme weighted by a confidence level niv_conf, in which a vector Yi of distribution of the $\Delta_{UIVE_i}^2$ of the IPPi considered over the associated IGPk is computed according to the equation: $Yi = Pi \cdot Hi^t \cdot (Hi \cdot Pi \cdot Hi^t)^{-1} \cdot \Delta_{UIVE_i}^2$ in which:

$$*Yi = \begin{bmatrix} \Delta_{GIVE_1^2} \\ \Delta_{GIVE_2^2} \\ \ldots \\ \Delta_{GIVE_{NIGP}^2} \end{bmatrix}$$

designates a column vector with $N_{IGP}$ components of the distribution of the variance increment $\Delta_{UIVE_i}^2$ to be distributed over the $N_{IGP}$ IGPk when the mesh cell of the IPPi considered comprises $N_{IGP}$ IGP, as result of solving the equation;

Hi=$[w_1\ w_2\ \ldots\ w_{NIGP}]$ designates a row vector with $N_{IGP}$ components for carrying out the interpolation of the IPPi considered, each component $w_k$, k varying from 1 to $N_{IGP}$, corresponding to the weight of an $IGP_k$ obtained with the direct interpolation computation scheme defined by the standard for the IPPi considered; and Pi is a diagonal square weighting matrix of rank $N_{IGP}$, defined by:

$$Pi = \begin{bmatrix} q_1 & 0 & \ldots & 0 \\ 0 & q_2 & \ldots & 0 \\ \ldots & \ldots & \ldots & \ldots \\ 0 & 0 & \ldots & q_{NIGP} \end{bmatrix}$$

with $$q_k = \left(\frac{t_{v_k,\alpha}}{G(p)}\right)^2$$

associated with the IGPk, k varying from 1 to $N_{IGP}$, $t_{v_k,\alpha}$ designating the associated Student's factor the IGPk of rank k dependent on $v_k$ the degree of freedom and dependent on the confidence probability $\alpha$, the said Student's factor $t_{v_k,\alpha}$ making it possible to bound an error with a predetermined confidence level (1-p) required by the SBAS service, the confidence probability $\alpha$ being related to the confidence level by the relation $$\alpha = 1 - \frac{1}{2} \cdot p,$$

and the degree of freedom $v_k$ being equal here to the number of IPP having generated a residual for the IGPk concerned minus one; and G(p) designating the value obtained when the Gaussian assumption is applied for the same confidence probability (1-p) as that used for the computation of $\alpha$, that is to say the limit of the Student's factor $t_{v_k,\alpha}$ when the degree of freedom $v_k$ tends to infinity; and $\Delta_{UIVE_i}^2$ designates the variance increment to be distributed;

the step of determining the values of variance increments $\Delta_{GIVE_k}^2$ to be allocated respectively to the IGPk of the mesh cell of the IPPi considered is implemented by a least squares scheme weighted by a confidence level 1-p in which a vector Yi of distribution of the $\Delta_{UIVE_i}^2$ of the IPPi considered over the associated IGPk is computed according to the equation:

$$Yi = Hi^t \cdot (Hi \cdot Hi^t)^{-1} \cdot \left[\Delta_{UIVE_i^2} \cdot \left(\frac{t_{Nb_{IPP\ MEAN},\alpha}}{G(p)}\right)^2\right]$$

in which:

$$*Yi = \begin{bmatrix} \Delta_{GIVE_1^2} \\ \Delta_{GIVE_2^2} \\ \ldots \\ \Delta_{GIVE_{NIGP}^2} \end{bmatrix}$$

designates a column vector with $N_{IGP}$ components of the distribution of the variance increment $\Delta_{UIVE_i}^2$ to be distributed over the $N_{IGP}$ IGPk when the mesh cell of the IPPi considered comprises $N_{IGP}$ IGP, as result of solving the equation;

Hi=$[w_1\ w_2\ \ldots\ w_{NIGP}]$ designates a row vector with $N_{IGP}$ components for carrying out the interpolation of the IPPi considered, each component $w_k$, k varying from 1 to $N_{IGP}$, corresponding to the weight of an $IGP_k$ obtained with the direct interpolation computation scheme defined by the standard for the IPPi considered; and $t_{Nb_{IPP\_MEAN},\alpha}$ designates a Student's factor dependent on the confidence probability $\alpha$, the said Student's factor $t_{Nb_{IPP\_MEAN},\alpha}$ making it possible to bound an error with a predetermined confidence level (1-p) required by the SBAS service, the confidence probability $\alpha$ being related to the confidence level by the relation $$\alpha = 1 - \frac{1}{2} \cdot p,$$

and the degree of freedom $Nb_{IPP\_MEAN}$ being a number computed on the basis of the weighted sum of the number of IPP in the neighbourhood of the IGPk having served in obtaining the UIVDi and UIVEi of the IPPi tested, according to the formula:

$$Nb_{IPP\_MEAN} = \frac{\sum_{k=1}^{N_{IGP}} w_k \cdot (Nb_{IPP_k} - 1)}{\sum_{k=1}^{N_{IGP}} w_k}$$

with:
$w_k$, the weight of the IGPk obtained by applying the interpolation scheme defined by the RTCA DO-229D standard to the IPPi concerned to obtain its UIVDi and UIVEi;

$Nb_{IPP\_k}$ corresponds to the number of IPP situated around the IGPk in the neighbourhood consisting of the union of all the cells containing this IGPk; and G(p) designating the value obtained when the Gaussian assumption is applied for the same confidence probability (1-p) as that used for $\alpha$, that is to say the limit of the Student's factor $t_{v_k,\alpha}$ when the degree of freedom $v_k$ tends to infinity; and $\Delta_{UIVE_i}^2$ designates the variance increment to be distributed;

the shape of each mesh cell is a triangular shape and the number $N_{IGP}$ of vertex IGPs of each mesh cell is equal to 3, or the shape of each mesh cell is the shape of a quadrilateral, preferably comprised from among the shapes of a rectangle, of a square and of a lozenge, and the number $N_{IGP}$ of vertex IGPs of each mesh cell is equal to 4.

The first invention also has as second subject an SBAS satellite-based augmentation system for augmenting the performance of a global navigation satellite system GNSS, the SBAS system comprising SBAS service(s) user terminals, one or more satellites for augmenting the satellites of the GNSS system and for broadcasting information messages to the user terminals, one or more RIMS observation stations furnished with GNSS receivers, and one or more computers. The SBAS system is configured to fit in an optimal manner ionospheric correction error bounds, called final GIVEs, of a first set of IGP points of an ionospheric correction grid for a service area of the SBAS system, the ionospheric correction grid being structured as a meshed network of cells of predetermined polygonal shape, the cells of the meshed network corresponding projectively to the SBAS service area and having as vertices IGP points of the first set. The SBAS system is characterized in that the electronic computer or computers are configured to:

on the basis of predetermined information in respect of ionospheric error correction of the IGP points of the first set, and of measurements of pseudo-distances of a second set of control and observation pierce points IPP which are contained in the cells of the ionospheric grid, for each observation pierce point IPPi of the second set, an innovation designated by $stdUIVDerror_i$, according to the expression:

$$stdUIVDerror_i = \frac{|VTEC_i - UIVD_i|}{\sqrt{\sigma_{VTEC_i}^2 + \sigma_{UIVE_i}^2}}$$

in which:
$VTEC_i$ designates the vertical ionospheric delay measured at the IPP i,
$UIVD_i$ designates the vertical ionospheric delay interpolated on the basis of the GIVDj of the IGPj of the mesh cell of rank m surrounding the IPPi concerned;
$\sigma_{VTEC_i}$ designates the standard deviation of the measurement noise at the IPPi,
$\sigma_{UIVE_i}$ designates the standard deviation arising from the GIVEs of the IGPj of the mesh cell of rank m having participated in the interpolation of the UIVDi of the IPPi concerned; and then when the innovation of the IPPi scanned in the current mesh cell of rank m is strictly greater than a theoretical threshold MaxThd corresponding to a predetermined confidence or integrity level (1-p) required by the SBAS service, compute a variance increment $\Delta_{UIVE_i}^2$ that would need to be added to the $\sigma_{UIVE_i}^2$ on the IPPi considered in order for it to cover the integrity level required according to the equation: $\Delta_{UIVE_i}^2 = (\beta + \sigma_{UIVE_i}^2) \times (K_{fact}^2 - 1)$ in which:

$\sigma_{UIVE_i}$ designates the standard deviation arising from the GIVEs of the IGPj of the mesh cell of rank m having participated in the interpolation of the UIVDi of the IPPi concerned;

$\beta$ and $K_{fact}^2$ designate respectively a first term and a second term, the first term $\beta$ being determined according to the equation: $\beta = \sigma_{VTEC_i}^2$ where $VTEC_i$ designates the vertical ionospheric delay measured at the IPPi considered, and the second term $K_{fact}^2$ being determined according to the equation:

$$K_{fact^2} = \frac{stdUIVDerror_i^2}{(SafMarg \times MaxThd)^2}$$

SafMarg designating the integrity margin as a percentage of the tolerated maximum threshold that one wishes to generate, greater than 0 and strictly less than 1, and configured as a function of an integrity guarantee margin as a predetermined relative value, denoted X and expressed as a percentage, according to the expression: SafMarg=(1−X); and then when the innovation of the IPPi scanned in the current mesh cell of rank m is strictly greater than a theoretical threshold MaxThd:
determine values of variance increments $\Delta_{GIVE_k}^2$ to be allocated respectively to the IGPk of the mesh cell of the IPPi considered by an inverse interpolation scheme using a Least Squares scheme so as to distribute the variance increment $\Delta_{UIVE_i}^2$ of the IPPi according to the relation:

$$\Delta_{UIVE_i^2} = \sum_{k=1}^{N_{IGP}} w_k \cdot \Delta_{GIVE_k^2}$$

in which
- $N_{IGP}$ is the number of IGPs of the mesh cell of predetermined shape that are used in the computation of the UIVDi and UIVEi of the IPPi considered;
- k designates a numbering index in the mesh cell containing the IPPi of the IGPs of the said mesh cell,
- $w_k$ designate the respective weights of the IGPk, k varying from 1 to $N_{IGP}$, computed by applying the GNSS standard according to a function of the GNSS standard which depends on the distance between the IPPi and the IGPk, the sum of the weights $w_k$ being equal to one; and then for each IGPk of the mesh cell m to which the IPPi considered belongs, update the variance $GIVE_k$ of the said IGPk by replacing the current value $\sigma_{GIVE_k}$ of the GIVEk with a new value equal to $\sqrt{\sigma_{GIVE_k}^2 + \Delta_{GIVE_k}^2}$.

A second invention relates to a second method for optimally computing the standard deviations called $\sigma_{MOPS}$ making it possible to model the error of interpolation, carried out between the IGPs and the pierce point of the signal received by the user, as well as the error of the rabattement function for mapping the vertical delay to the slant delay, the said rabattement function dependent on the satellite elevation and on the antenna of the GNSS terminal. The standard deviations $\sigma_{MOPS}$ are involved in the computation of the final GIVEs and constitute one of the terms that are added to the Basic GIVE to obtain the final GIVE. Thus the standard deviation $\sigma_{MOPS}$ contributes to conferring on the final error bound ensuring integrity, that is to say the final GIVE, the confidence required in order to comply with the high safety of predetermined SBAS services such as those relating to precise aerial operations. This term is particularly significant since it makes it possible to recentre the error obtained on account of the limitations induced by the inaccuracies caused by the computation laws imposed by the standard.

According to the current scheme for computing the standard deviations called $\sigma_{MOPS}$, for each IGP point a neighbourhood V of pierce points surrounding the IGP is defined. For each measurement pierce point IPPi contained in this neighbourhood V, a residual denoted $Res_i$, referred to the vertical, is computed according to the equation:

$$Res_i = \frac{STEC_i - UISD_i}{F_{pp\ standard}} \quad \text{(equation \#8)}$$

in which:
- STECi designates the ionospheric delay of the real line of sight, therefore dependent on the elevation;
- UISDi designates the vertical ionospheric delay interpolated according to the standard on the basis of the GIVDk of the IGPk of the mesh cell or cell surrounding the IPPi;
- $F_{pp\ standard}$ designates the standard rabattement function for mapping the ionospheric delay as a function of the elevation of the line of sight.

The residual $Res_i$ is referred to the vertical because of the fact that the delays and their error bound at the level of the IGPk are always formulated as vertical so as to allow the user to adapt them according to the elevation of their own lines of sight.

The residual $Res_i$ of the measurement pierce point IPPi is thereafter weighted according to the quality of its measurement and the distance of the IPPi with respect to the IGP considered:

$$p_i = f(\sigma_{VTEC}^2, \text{Distance}) \quad \text{(equation \#9)}$$

Once the residual $Res_i$ has been obtained for each IPPi situated in the neighbourhood V containing the IGP considered, a mean error, arising from the various residuals, is evaluated. This error value can be computed in several different ways, the aim being to obtain the most representative possible value of the bias generated by the use of the interpolation and rabattement schemes defined by the standard so as to "recentre" the GIVE error bound and guarantee the integrity level required according to a centred Gaussian law.

In the EGNOS system (standing for "European Geostationary Navigation Service"), this term is a designated standard deviation called $\sigma_{MOPS}$ (the acronym MOPS being the standard defining the EGNOS system).

This value of standard deviation or of RMS (Root Mean Square) is computed as being the square root of the mean of the weighted squares of the residuals according to the equation:

$$\sigma_{MOPS} = \sqrt{\frac{1}{P} \times \sum_{i=1}^{N_{ipp}} \frac{1}{p_i} \times Res_i^2} \quad \text{(equation \#10)}$$

with:
P equal to the sum of the normalized weights according to the formula:

$$P = \sum_{i=1}^{N_{ipp}} \frac{1}{p_i}$$

where Nipp designates the number of measurement pierce point IPPi contained in the neighbourhood V surrounding the IGP considered.

The main limitation related to this currently used computation scheme is the devising of the weighting, since each IPPi contributes differently as a function of the distance to the IGP and of the quality of the measurement. Moreover, given that at least three IGPs, four in the case of a rectangular or square mesh cell, are in reality involved in the computation of the UISDi of each IPPi, some information has been lost and the amount of error that is injected into the residual once weighted is not perfectly under control.

Thereafter, the $\sigma_{MOPS}$ is expanded according to the number of IPPi having contributed to its estimation by a Student's factor making it possible to define the confidence index of the value measured with respect to a Gaussian assumption:

$$\sigma_{MOPS} = \left(\frac{t_{v_k, 0.99999995}}{5.33}\right) \times \sigma_{MOPS}$$

with:
- $t_{v_k, 0.99999995}$, the Student's factor as a function of $v_k$, the degree of freedom (here it is the number of IPP) making it possible to bound an error with a probability of $10^{-7}$ required by the aeronautical standard; and
- 5.33 which is the value obtained when the Gaussian assumption is applied, for the same probability as that defined hereinabove, that is to say 0.9999999 of confidence.

The second invention is aimed at remedying the aforementioned drawbacks, in particular the main limitation mentioned.

The second technical problem that the second invention solves is to propose a method for optimally fitting the standard deviations $\sigma_{MOPS}$ of IGP points of an ionospheric correction grid for a service area of an SBAS system, and a system for implementing the said method, which are independent of the configuration or of the spatial distribution of the measurement pierce points IPP situated around the interpolation IGPs.

For this purpose, the second invention has as third subject a method for optimally computing the variances of the residuals of a first set of IGP points of an ionospheric correction grid for a service area of an SBAS system, the ionospheric correction grid being structured as a meshed network of cells of predetermined polygonal shape, the cells of the meshed network corresponding projectively to the SBAS service area and having as vertices IGP points of the first set. The method for optimally computing the variances of the residuals of the IGPs comprises the steps consisting in:

computing with at least one electronic computer, on the basis of predetermined information in respect of ionospheric error correction of the IGP points of the first set, and of measurements of pseudo-distances of a second set of control and observation pierce points IPP which are contained in the cells of the ionospheric grid, for each observation pierce point IPPi of the second set, a residual, designated by $Res_i$, referred to the vertical, according to the equation:

$$Res_i = \frac{STEC_i - UISD_i}{F_{pp\,standard}}$$

in which: STECi designates the ionospheric delay, measured by an observation station, of the real line of sight and which is dependent on the elevation of the said line of sight, UISDi designates the vertical ionospheric delay interpolated according to the standard of the user terminal on the basis of the GIVDk of the IGPk of the mesh cell surrounding the IPPi, and $F_{pp\,standard}$ designates the standard rabattement function for mapping the ionospheric delay as a function of the elevation of the line of sight, and then the square of the residual. The method for optimally computing the variances of the residuals of the IGPs is characterized in that it furthermore comprises the steps consisting in:

for each observation pierce point IPPi of the second set, determining values of variance increments $\Delta_{Resk}^2$ to be allocated respectively to the IGPk of the mesh cell m of the IPPi considered by an inverse interpolation scheme using a Least Squares scheme in which a vector Yi of distribution of the square of the residual $Res_i^2$ of the IPPi considered is computed according to the equation $Yi = Hi^t \cdot (Hi \cdot Hi^t)^{-1} \cdot Res_i^2$ in which:

H=[$w_1$ $w_2$ ... $w_{NIGP}$] designates a row vector with $N_{IGP}$ components for carrying out the interpolation of the IPPi considered, each component $w_k$, k varying from 1 to $N_{IGP}$, corresponding to the weight of an $IGP_k$ obtained with the direct interpolation computation scheme defined by the standard for the IPPi considered;

$$*Yi = \begin{bmatrix} \Delta_{Res1}^2 \\ \Delta_{Res2}^2 \\ ... \\ \Delta_{ResNIGP}^2 \end{bmatrix}$$

designates a column vector with $N_{IGP}$ components of the distribution of the square of the residual $Res_i^2$ to be distributed over the $N_{IGP}$ IGPk when the mesh cell of the IPPi considered comprises $N_{IGP}$ IGP, as result of solving the equation;

$Res_i^2$ designates the square of the residual to be distributed, and then determining a weighting coefficient pi as inverse of a weight, this weighting coefficient being representative of the quality of the measurement of the STECi rectified into VTECi by dividing by the rabattement function for mapping the IPPi considered, and expressed according to the following formula $$p_i = \frac{\sigma_{VTEC_i}^2}{\sigma_{VTEC\,NOMINAL}^2}$$

in which
$\sigma_{VTEC_i}^2$ designates the measurement noise in respect of the pseudo-distance measured by the measurement terminal for the IPPi considered, and
$\sigma_{VTEC_iNOMINAL}^2$ designates a nominal reference measurement noise of the measurement terminal;

thereafter, after having computed all the Yi and pi corresponding to the first set of the pierce points IPPi observed, for each IGP, computing an unexpanded-residual variance according to the equation:

$$\sigma_{MOPS} = \sqrt{\frac{1}{Ps} \times \sum_{i=1}^{Nipp} \frac{1}{p_i} \times \Delta_{Res_{ippi}}^2}$$

with:
Ps, the sum of the normalized weights $1/p_i$ of each residual that are available for the following IGP considered:

$$Ps = \sum_{i=1}^{N_{ipp}} \frac{1}{p_i}$$

$N_{ipp}$ being the number of IPPs having generated a residual for the IGP concerned,
$\Delta_{Res_{ipp\,i}}^2$ the residual interpolated as inverse at the IGP considered for the IPPi forming part of the IPPs having generated a residual for the IGP concerned.

According to particular embodiments, the method for optimally computing the variances of the residuals of a first set of IGP points of an ionospheric correction grid for a service area of an SBAS system comprises one or more of the following characteristics:

the weighting coefficient $p_i$ is modulated by the inverse of the weight $w_i$ of the IPPi according to the IGP such as defined by the MOPS DO-229 standard and may be written according to the expression:

$$p_i = \frac{1}{w_i} \times \frac{\sigma^2_{VTEC_i}}{\sigma^2_{VTEC\ NOMINAL}},$$

and the standard deviation $\sigma_{MOPS}$ of the IGP considered is computed according to the expression $\sigma_{MOPS} = \sqrt{(K \cdot P \cdot K^t)^{-1} \cdot K \cdot P \cdot X^t}$ in which:

K designates the unit row vector of dimension Nipp: K=[1 1 ... 1],

P designates the diagonal matrix of weights $$P = \begin{bmatrix} \frac{1}{p_1} & \cdots & 0 \\ \vdots & \ddots & \vdots \\ 0 & \cdots & \frac{1}{p_{Nipp}} \end{bmatrix},$$

and

X designates the column vector of residuals:

$$X = \begin{bmatrix} \Delta^2_{Res_1} \\ \vdots \\ \Delta^2_{Res_{Nipp}} \end{bmatrix};$$

the weighting coefficient $p_i$ is modulated by the inverse of the weight $w_{i\ centre\ norm}$ of the IPPi according to the IGP the expression:

$$p_i = \frac{1}{w_{i\ \text{centre norm}}} \times \frac{\sigma^2_{VTEC_i}}{\sigma^2_{VTEC\ NOMINAL}}$$

in which the weight $w_{i\ centre\ norm}$ is computed according to the equation:

If $w_i = 0$, then the IPP is not used for the computation of the $\sigma_{MOPS}$ of the IGP considered If $$0 < w_i < \frac{1}{N_{IGP}}, \text{ then } w_{i\ center\ norm} = w_i$$

Otherwise, $$w_{i\ center\ norm} = 1 - \frac{w_{i\ center\ ini}}{\sum_{i=1}^{N_{IGP}} w_{i\ center\ ini}},$$

$N_{IGP}$ corresponding to the number of IGP having served in the interpolation of the ionospheric delay at the IPPi and the term $w_{i\ center\ ini}$ being written $$w_{i\ center\ ini} = \left| w_i - \frac{1}{N_{IGP}} \right|,$$

the weight $w_i$ being defined by the MOPS DO-229 standard, and the standard deviation $\sigma_{MOPS}$ of the IGP considered is computed according to the expression $\sigma_{MOPS} = \sqrt{(K \cdot P \cdot K^t)^{-1} \cdot K \cdot P \cdot X^t}$ in which:

K designates the unit row vector of dimension Nipp: K=[1 1 ... 1],

P designates the diagonal matrix of weights $$P = \begin{bmatrix} \frac{1}{p_1} & \cdots & 0 \\ \vdots & \ddots & \vdots \\ 0 & \cdots & \frac{1}{p_{Nipp}} \end{bmatrix},$$

and

X designates the column vector of residuals:

$$X = \begin{bmatrix} \Delta^2_{Res_1} \\ \vdots \\ \Delta^2_{Res_{Nipp}} \end{bmatrix}$$

the method for optimally computing the standard deviations comprises an additional step consisting in, for each IGPk of the second set, computing an expanded-residual variance $\sigma_{MOPS}^d$ on the basis of the unexpanded-residual variance $\sigma_{MOPS}$ according to the equation:

$$\sigma_{MOPS}^d = \left( \frac{t_{v_k,\alpha}}{G(p)} \right) \cdot \sigma_{MOPS} \text{ with } d_k = \left( \frac{t_{v_k,\alpha}}{G(p)} \right)$$

the expansion coefficient associated with the IGPk, k varying from 1 to $N_{IGP}$, $t_{v_k,\alpha}$ designating the associated Student's factor the IGPk of rank k dependent on $v_k$ the degree of freedom and dependent on the confidence probability $\alpha$, the said Student's factor $t_{v_k,\alpha}$ making it possible to bound an error with a predetermined confidence level (1-p) required by the SBAS service, the confidence probability $\alpha$ being related to the confidence level by the relation $$\alpha = 1 - \frac{1}{2} \cdot p,$$

and the degree of freedom $v_k$ being equal here to the number of IPP having generated a residual for the IGPk concerned minus one; and G(p) designating the value obtained when the Gaussian assumption is applied for the same confidence probability $\alpha$, that is to say the limit of the Student's factor $t_{v_k,\alpha}$ when the degree of freedom $v_k$ tends to infinity.

The invention also has as fourth subject a simplified method for optimally computing the variances $\sigma_{MOPS}^2$ of the residuals of a first set of IGP points of an ionospheric correction grid for a service area of an SBAS system, the ionospheric correction grid being structured as a meshed network of cells of predetermined polygonal shape, the cells of the meshed network corresponding projectively to the SBAS service area and having as vertices IGP points of the first set. The method for optimally computing the variances of the residuals of the IGPs comprises the steps consisting in:

computing with at least one electronic computer, on the basis of predetermined information in respect of ionospheric error correction of the IGP points of the first set, and of measurements of pseudo-distances of a second set of control and observation pierce points IPP which are contained in the cells of the ionospheric grid, for each observation pierce point IPPi of the second set, a residual, designated by $Res_i$, referred to the vertical, according to the equation $$Res_i = \frac{STEC_i - UISD_i}{F_{pp\ standard}}$$

in which:
  $STEC_i$ designates the ionospheric delay, measured by an observation station, of the real line of sight and which is dependent on the elevation of the said line of sight;
  $UISD_i$ designates the vertical ionospheric delay interpolated according to the standard of the user terminal on the basis of the $GIVD_k$ of the $IGP_k$ of the mesh cell surrounding the IPPi;
  $F_{pp\ standard}$ designates the standard rabattement function for mapping the ionospheric delay as a function of the elevation of the line of sight, and then the square of the residual. The method for optimally computing the variances of the residuals of the IGPs is characterized in that it furthermore comprises the steps consisting in:
for each observation pierce point IPPi of the second set, determining values of variance increments $\Delta_{Resk}^2$ to be allocated respectively to the $IGP_k$ of the mesh cell m of the IPPi considered by an inverse interpolation scheme using a Least Squares scheme in which a vector Yi of distribution of the square of the residual $Res_i^2$ of the IPPi considered is computed according to the equation: $Yi = Hi^t \cdot (Hi \cdot Hi^t)^{-1} \cdot Res_i^2$
in which:
  $H=[w_1\ w_2\ \ldots\ w_{NIGP}]$ designates a row vector with $N_{IGP}$ components for carrying out the interpolation of the IPPi considered, each component $w_k$, k varying from 1 to $N_{IGP}$, corresponding to the weight of an $IGP_k$ obtained with the direct interpolation computation scheme defined by the standard for the IPPi considered;

$$^*Yi = \begin{bmatrix} \Delta_{Res1}^2 \\ \Delta_{Res2}^2 \\ \ldots \\ \Delta_{REesNIGP}^2 \end{bmatrix}$$

designates a column vector with $N_{IGP}$ components of the distribution of the square of the residual $Res_i^2$ to be distributed over the $N_{IGP}$ $IGP_k$ when the mesh cell of the IPPi considered comprises $N_{IGP}$ IGP, as result of solving the equation;
  $Res_i^2$ designates the square of the residual to be distributed, and then
  determining a weighting coefficient pi as inverse of a weight, this weighting coefficient being representative of the quality of the measurement of the $STEC_i$ rectified into $VTEC_i$ by dividing by the rabattement function for mapping the IPPi considered, and expressed according to the following formula $$p_i = \frac{1}{w_i} \times \frac{\sigma_{VTEC_i}^2}{\sigma_{VTEC\ NOMINAL}^2}$$

in which:
  $\sigma_{VTEC_i}^2$ designates the measurement noise in respect of the pseudo-distance measured by the measurement terminal for the IPPi considered,
  $w_i$ designates the weight of the IPPi according to the IGP such as defined by the DO-229 standard; and
  $\sigma_{VTEC_i}^2$ designates a nominal reference measurement noise of the measurement terminal;
  thereafter, after having computed all the Yi and pi corresponding to the first set of the pierce points IPPi observed, for each IGP,
  sorting the residuals computed by the inverse interpolation scheme by removing the residuals computed on the basis of those IPPi whose measurement qualities are insufficient with respect to a predetermined quality threshold, and retaining the $N_{ipp\_fil}$ computed residuals, and then
  computing an unexpanded simplified residual variance according to the equation:

$$\sigma_{MOPS\_simp} = \sqrt{\frac{1}{N_{ipp\_fil}} \times \sum_{i=1}^{N_{ipp\_fil}} \Delta_{Res_{ippi}}^2}$$

in which:
  $N_{ipp\_fil}$ designates the number of IPPs having generated a residual for the IGP concerned and whose measurement quality is sufficient;
  $\Delta_{Res_{ipp\ i}}^2$ is the residual interpolated as inverse at the IGP considered for the IPPi forming part of the sorted IPPs having generated a residual for the IGP concerned.

According to particular embodiments, the simplified method for optimally computing the variances $\sigma_{MOPS}^2$ of the residuals of a first set of IGP points of an ionospheric correction grid for a service area of an SBAS system comprises one or more of the following characteristics:
  for each $IGP_k$ of the second set, compute an expanded simple residual variance $\sigma_{MOPS\_simp}^d$ on the basis of the unexpanded simple residual variance $\sigma_{MOPS\_simp}$ according to the equation:

$$\sigma_{MOPS\_simp}^d = \left(\frac{t_{v_k,\alpha}}{G(p)}\right) \cdot \sigma_{MOPS\_simp}\ \text{with}\ d_k = \left(\frac{t_{v_k,\alpha}}{G(p)}\right)$$

associated with the $IGP_k$, k varying from 1 to $N_{IGP}$, $t_{v_k,\alpha}$ designating the associated Student's factor the $IGP_k$ of rank k dependent on $v_k$ the degree of freedom and dependent on the confidence probability $\alpha$, the said Student's factor $t_{v_k,\alpha}$ making it possible to bound an error with a predetermined confidence level (1-p) required by the SBAS service, the confidence probability $\alpha$ being related to the confidence level by the relation $$\alpha = 1 - \frac{1}{2} \cdot p,$$

and the degree of freedom $v_k$ being equal here to the number of IPP having generated a residual for the $IGP_k$ concerned minus one; and G(p) designating the value obtained when the Gaussian assumption is applied for the same confidence probability α, that is to say the limit of the Student's factor $t_{v_k,\alpha}$ when the degree of freedom $v_k$ tends to infinity;

the shape of each mesh cell is a triangular shape and the number $N_{IGP}$ of vertex IGPs of each mesh cell is equal to 3, or the shape of each mesh cell is the shape of a quadrilateral, preferably comprised from among the shapes of a rectangle, of a square and of a lozenge, and the number $N_{IGP}$ of vertex IGPs of each mesh cell is equal to 4.

The invention also has as fifth subject an SBAS satellite-based augmentation system for augmenting the performance of a global navigation satellite system GNSS, the SBAS system comprising SBAS service(s) user terminals, one or more satellites for augmenting the satellites of the GNSS system and for broadcasting information messages to the user terminals, one or more observation stations furnished with GNSS receivers, and one or more computers. The SBAS system is configured to compute in an optimal manner variances of the residuals of a first set of IGP points of an ionospheric correction grid for a service area of an SBAS system, the ionospheric correction grid being structured as a meshed network of cells of predetermined polygonal shape, the cells of the meshed network corresponding projectively to the SBAS service area and having as vertices IGP points of the first set. The SBAS system is characterized in that the electronic computer or computers are configured to:

on the basis of predetermined information in respect of ionospheric error correction of the IGP points of the first set, and of measurements of pseudo-distances of a second set of control and observation pierce points IPP which are contained in the cells of the ionospheric grid, for each observation pierce point IPPi of the second set, a residual, designated by $Res_i$, referred to the vertical, according to the equation:

$$Res_i = \frac{STEC_i - UISD_i}{F_{pp\ standard}}$$

in which:
STECi designates the ionospheric delay, measured by an observation station, of the real line of sight and which is dependent on the elevation of the said line of sight;
UISDi designates the vertical ionospheric delay interpolated according to the standard of the user terminal on the basis of the GIVDk of the IGPk of the mesh cell surrounding the IPPi;
$F_{pp\ standard}$ designates the standard rabattement function for mapping the ionospheric delay as a function of the elevation of the line of sight, and then compute the square of the residual; and thereafter
for each observation pierce point IPPi of the second set, determine values of variance increments $\Delta_{Resk}^2$ to be allocated respectively to the IGPk of the mesh cell m of the IPPi considered by an inverse interpolation scheme using a Least Squares scheme in which a vector Yi of distribution of the square of the residual $Res_i^2$ of the IPPi considered is computed according to the equation $Yi = Hi^t \cdot (Hi \cdot Hi^t)^{-1} \cdot Res_i^2$ in which:
$H = [w_1\ w_2\ \ldots\ w_{NIGP}]$ designates a row vector with $N_{IGP}$ components for carrying out the interpolation of the IPPi considered, each component $w_k$, k varying from 1 to $N_{IGP}$, corresponding to the weight of an $IGP_k$ obtained with the direct interpolation computation scheme defined by the standard for the IPPi considered;

$$*Yi = \begin{bmatrix} \Delta_{Res1}^2 \\ \Delta_{Res2}^2 \\ \ldots \\ \Delta_{ResNIGP}^2 \end{bmatrix}$$

designates a column vector with $N_{IGP}$ components of the distribution of the square of the residual $Res_i^2$ to be distributed over the $N_{IGP}$ IGPk when the mesh cell of the IPPi considered comprises $N_{IGP}$ IGP, as result of solving the equation;
$Res_i^2$ designates the square of the residual to be distributed, and then
determine a weighting coefficient pi as inverse of a weight, this weighting coefficient being representative of the quality of the measurement of the STECi rectified into VTECi by dividing by the rabattement function for mapping the IPPi considered, and expressed according to the following formula:

$$p_i = \frac{\sigma_{VTEC_i}^2}{\sigma_{VTEC\ NOMINAL}^2}$$

in which:
$\sigma_{VTEC_i}^2$ designates the measurement noise in respect of the pseudo-distance measured by the measurement terminal for the IPPi considered, and
$\sigma_{VTEC_i}^2$ designates a nominal reference measurement noise of the measurement terminal;
thereafter, after having computed all the Yi and pi corresponding to the first set of the pierce points IPPi observed,
for each IGP, compute an unexpanded-residual variance according to the equation:

$$\sigma_{MOPS} = \sqrt{\frac{1}{Ps} \times \sum_{i=1}^{Nipp} \frac{1}{p_i} \times \Delta_{Res_{ippi}}^2}$$

in which
Ps is the sum of the normalized weights $1/p_i$ of each residual that are available for the following IGP considered:

$$Ps = \sum_{i=1}^{N_{ipp}} \frac{1}{p_i}$$

$N_{ipp}$ designates the number of IPPs having generated a residual for the IGP concerned,
$\Delta_{Res_{ipp\ i}}^2$ is the residual interpolated as inverse at the IGP considered for the IPPi forming part of the IPPs having generated a residual for the IGP concerned.

BRIEF DESCRIPTION OF THE DRAWINGS

The invention will be better understood on reading the description of several embodiments which will follow and which is given solely by way of example while referring to the drawings in which.

DETAILED DESCRIPTION

Figure 1:
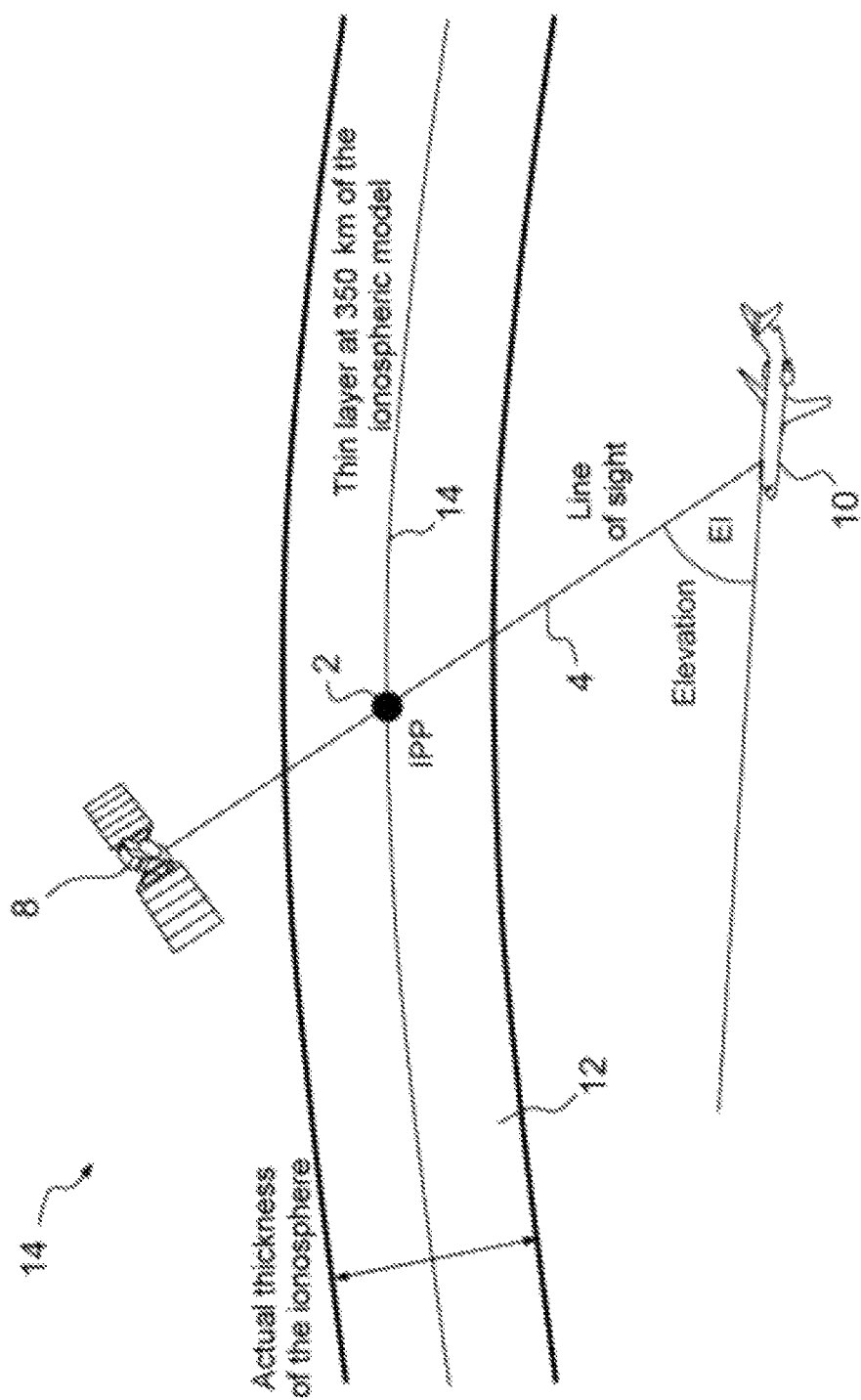
FIG. 1 is a first partial view according to the prior art of an SBAS system illustrating the ionospheric correction grid and the definition of a pierce point IPP.
Figure 2:
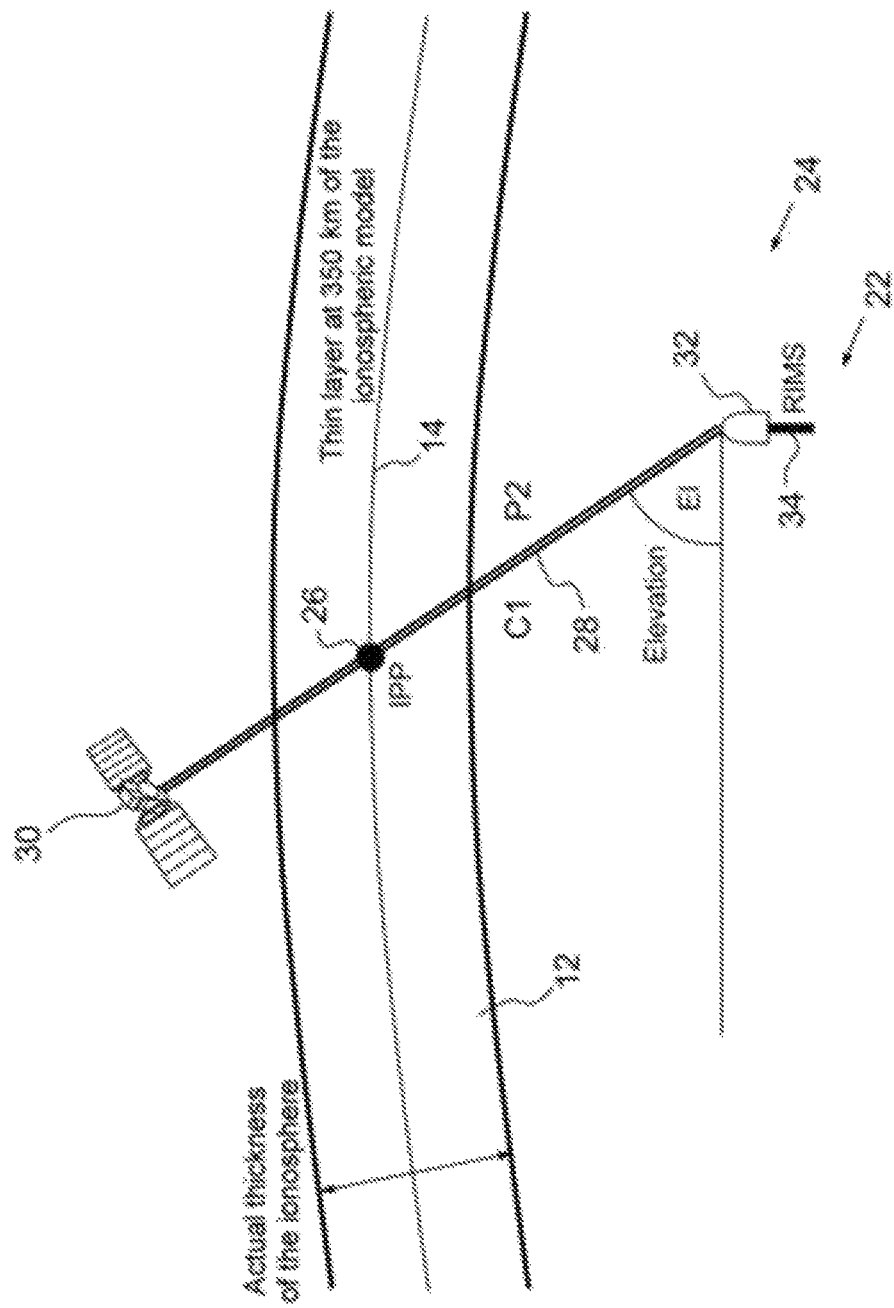
FIG. 2 is a second partial view according to the prior art of the SBAS system according to the invention illustrating the ionospheric correction grid and dual-frequency pseudo-distance measurements performed on the basis of a RIMS observation and control station
Figure 3:
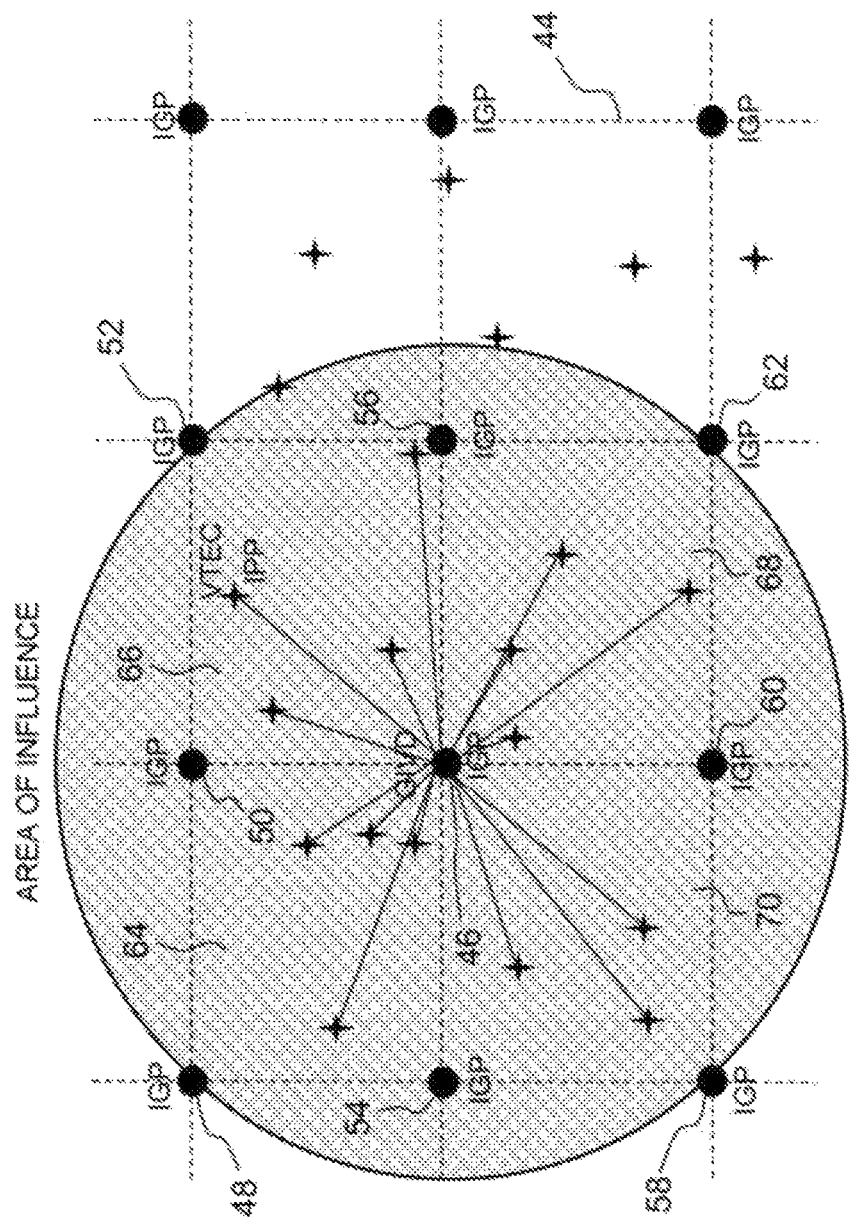
FIG. 3 is a first partial view from above according to the prior art of an exemplary mesh of the IGPs of the ionospheric correction grid and of the IPPs contained in an area of influence allowing the computation of the GIVD of a given IGP interpolation point.
Figure 4:
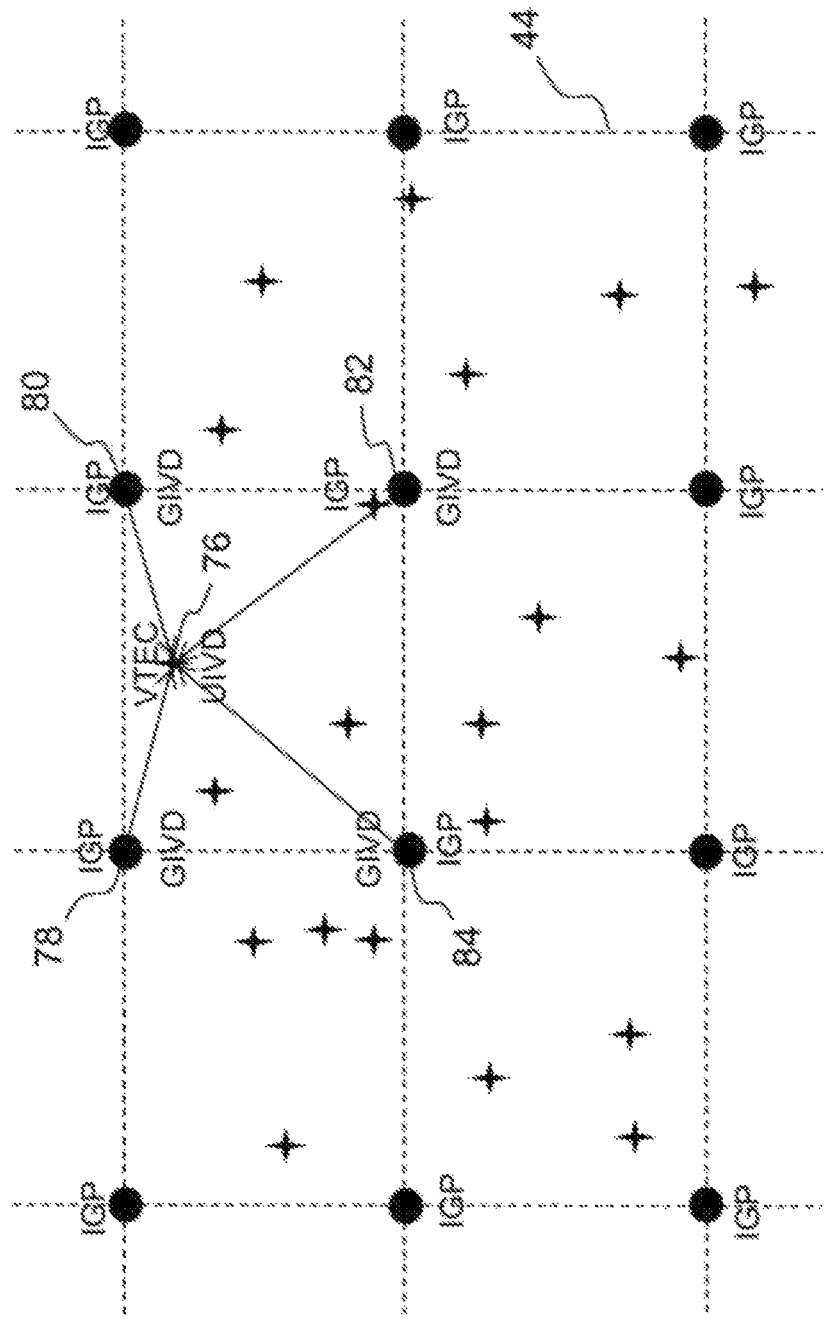
FIG. 4 is a second partial view from above according to the prior art of an exemplary mesh of the IGPs of the ionospheric correction grid and of the configuration for computation of the UIVD for a given IPP.
Figure 5:
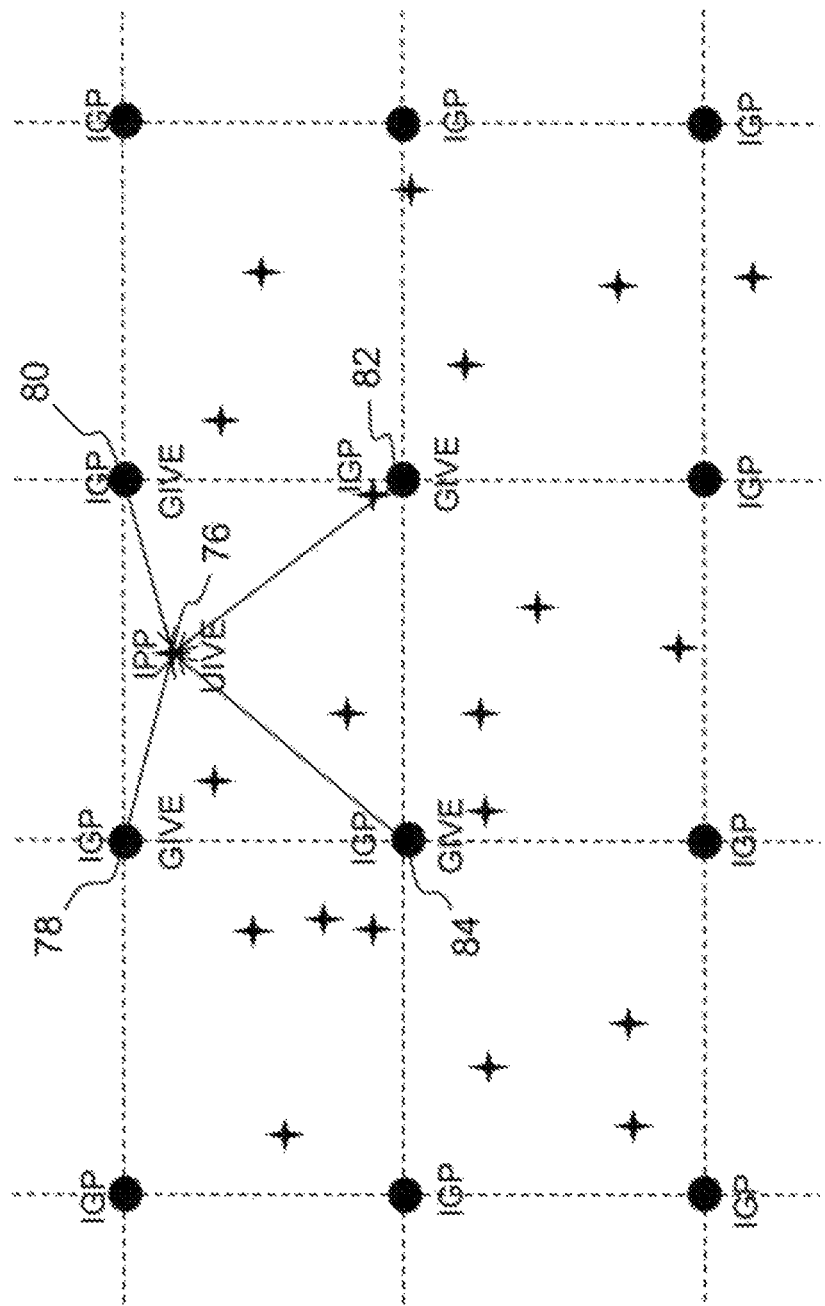
FIG. 5 is a third partial view from above according to the prior art of an exemplary mesh of the IGPs of the ionospheric correction grid and of the configuration for computation of the UIVE for a given IPP.
Figure 6:
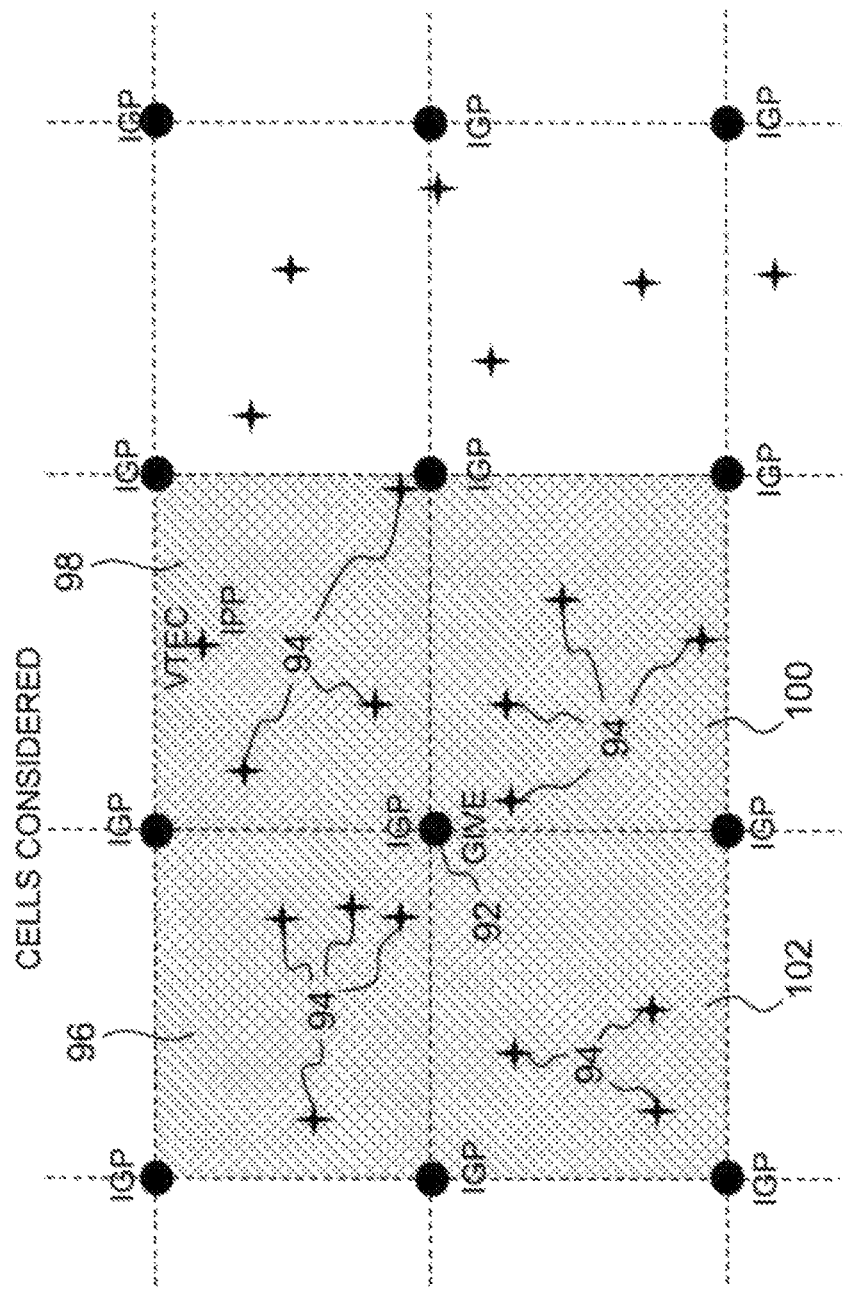
FIG. 6 is a fourth partial view from above according to the prior art of an exemplary mesh of the IGPs of the ionospheric correction grid in which according to a known method for fitting the GIVEs, a first test loop for the IGPs is scanned, the testing of an IGP entailing the verification of the integrity on each IPP in which the calculation of its UIVD/UIVE has involved the tested IGP.
Figure 7:
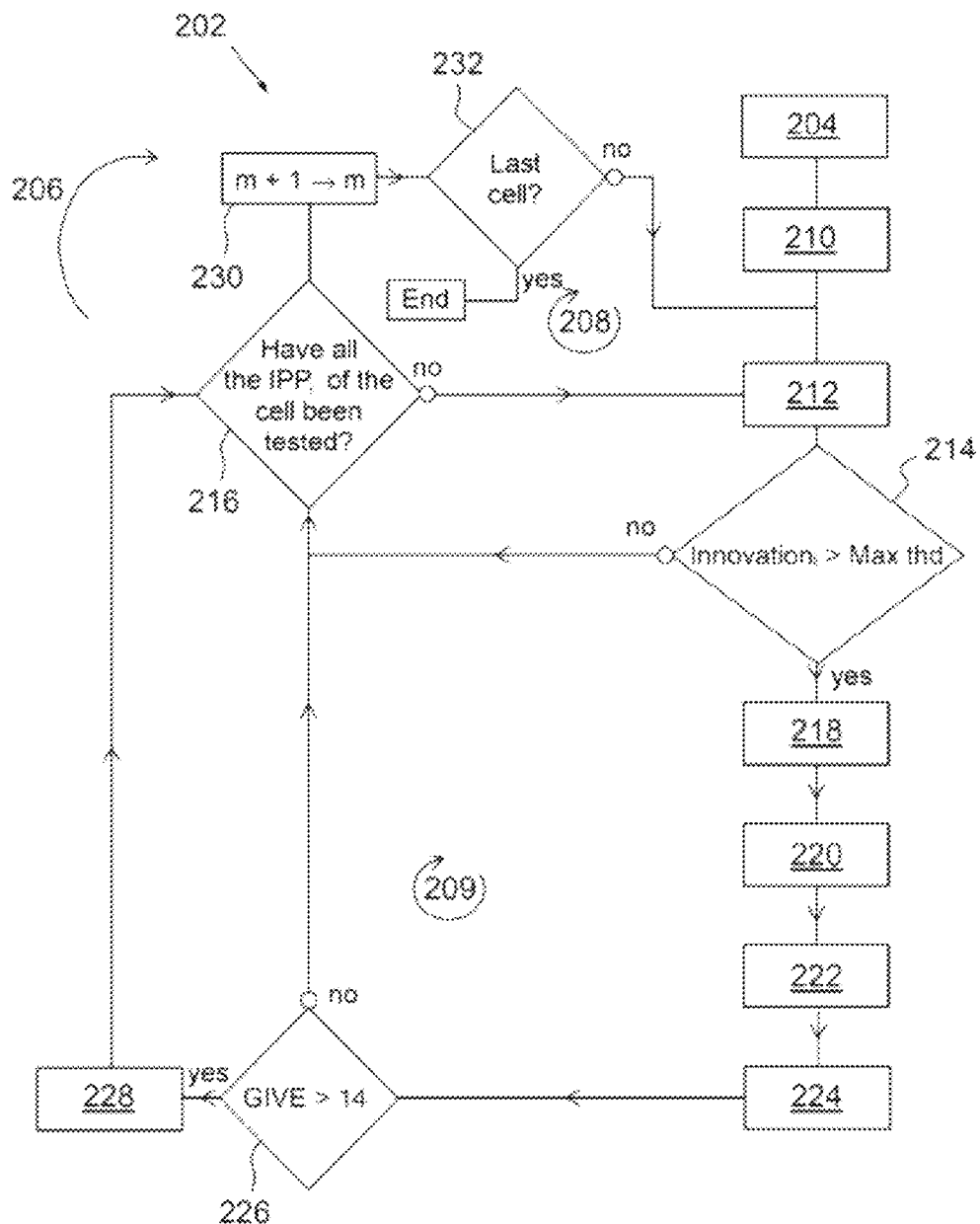
FIG. 7 is a flowchart of a method of optimal fitting according to the invention of the error bounds of GIVE correction of a first set of IGP points of an ionospheric correction grid for a service area of an SBAS system.

According to FIG. 7 and the first invention, a method 202 for optimally fitting error bounds, called final GIVEs and associated with a first set of points IGPj of an ionospheric correction grid for a service area of an SBAS system, is implemented by one or more computers, on the basis on the one hand of information in respect of ionospheric-error corrections calculated for the said points IGPj of the first set, j designating an integer index for identifying and scanning the said points IGPi of a portion of the ionospheric grid, structured as a meshed network of cells having a predetermined shape and corresponding to the SBAS service area, and on the basis on the other hand of information in respect of measurements of pseudo-distances of a second set of control pierce points IPPi which are contained in the cells of the service portion of the ionospheric grid, the measurements of pseudo-distances being performed by so-called RIMS control and telemetry stations.

The points IGPj of the ionospheric grid portion corresponding to the coverage of the SBAS service area form a meshed network whose mesh cells have one and the same predetermined shape, and this shape is comprised from among triangular shapes and quadrilateral shapes, preferably rectangular, square or lozenge shapes.

The provision of the information in respect of ionospheric-error corrections calculated for the said points IGPj of the first set and of the information in respect of measurements of pseudo-distances of the second set of control pierce points IPPi is implemented in the course of a prior step 204 of calculating and providing the said information forming a step of initializing the method 202 for optimally fitting the error bounds of final GIVEs.

In contradistinction to what is done in the method of the prior art the method according to the invention does not perform any IGP-wise integrity verification tests by scanning through a scan loop for the IGPs on the first set, but performs IPP-wise integrity verification tests by scanning through a global scan loop 206 for the IPPi on the second set.

The IPPi of the first set are partitioned into their membership cells or mesh cells and the global scan loop 206 for the IPPi comprises a first 208 loop for scanning the cells of the grid portion according to an order or a scan pattern which is predetermined, and comprises, nested in the first loop 208 for scanning the cells, a second local loop 209 for scanning the IPPi belonging to one and the same cell of the ionospheric grid portion.

The method 202 for optimally fitting final-GIVE error bounds comprises a set of steps executed after the prior step 204.

In a first step 210, a first commencing and initializing cell for first loop 208 is selected according to the initial rank that it occupies in the predetermined scan pattern for the cells. The scan index of the first loop being designated by m, the index m is set to 1 and corresponds to the initial rank 1 of the first cell of the pattern.

Next, for each IPPi contained in the cell of current rank m in the order of scanning of the first loop, the following steps are executed.

In a second step 212, for the relevant IPPi of rank i contained in the cell of current rank m, the innovation, designated by $stdUIVDerror_i$, of the relevant IPPi is computed according to the expression:

$$stdUIVDerror_i = \frac{|VTEC_i - UIVD_i|}{\sqrt{\sigma_{VTEC_i}^2 + \sigma_{UIVE_i}^2}} \quad \text{(equation \#11)}$$

in which:
$VTEC_i$ designates the vertical ionospheric delay measured at the IPP
$UIVD_i$ designates the vertical ionospheric delay interpolated on the basis of the GIVDj of the IGPj of the mesh cell of rank m surrounding the IPPi concerned;
$\sigma_{VTEC_i}$ designates the standard deviation of the measurement noise at the IPPi,
$\sigma_{UIVE_i}$ designates the standard deviation arising from the GIVEs of the IGPj of the mesh cell of rank m having participated in the interpolation of the UIVDi of the IPPi concerned.

Thereafter, in a third test step 214, it is verified whether the innovation of the current IPPi scanned in the current mesh cell of rank m is strictly greater than a predetermined theoretical threshold, designated by MaxThd, the test condition being written:

$$stdUIVDerror_i \geq MaxThd$$

For example, MaxThd, is taken equal to 5.33 under assumptions of Gaussian distribution of the error, this corresponding to a confidence level required by the SBAS service equal to $(1-10^{-7})$, i.e. a confidence of 99.99999%. This theoretical threshold will be able to be modified if it is desired to modify the probability level required and will be denoted hereinafter G(p) with (p)=erf$^{-1}$(1−p)×$\sqrt{2}$, erf$^{-1}$(•) designating the reciprocal function of the error function and (1-p) designating the required confidence level. It should be noted here that the permitted maximum threshold can be computed with a margin, thus avoiding cases judged to be too limiting.

If this condition is not satisfied, that is to say if the innovation of the current IPPi is less than or equal to the predetermined theoretical threshold MaxThd, this means that the IGPj of the current mesh cell of rank m having served for the interpolation of the UIVDi of the IPPi considered have a GIVEj which is sufficient to guarantee the integrity level required. In this case, the GIVEj of the current mesh cell remain unchanged and a fourth step 216 of testing for the end of the second local scan loop for the IPPi contained in the mesh cell of current rank m is executed.

If this condition is satisfied, that is to say if the innovation of the current IPPi exceeds the threshold MaxThd, then, the quantity $\Delta_{UIVE_i}^2$ that would need to be added to the $\sigma_{UIVE_i}^2$ on the IPPi considered in order for it to cover the integrity level required is computed in a fifth step 218 according to the equation:

$$\Delta_{UIVE_i}^2 = (\beta + \sigma_{UIVE_i}^2) \times (K_{fact}^2 - 1) \qquad \text{(equation #12)}$$

in which:

$\sigma_{UIVE_i}$ designates the standard deviation arising from the GIVEs of the IGPj of the mesh cell of rank m having participated in the interpolation of the UIVDi of the IPPi concerned;

$\beta$ and $K_{fact}^2$ designate respectively a first term and a second term.

The first term $\beta$ may be written according to the equation:

$$\beta = \sigma_{VTEC_i}^2$$

where $VTEC_i$ designates the vertical ionospheric delay measured at the IPPi considered.

The second term $K_{fact}^2$ may be written according to the equation:

$$K_{fact}^2 = \frac{stdUIVDerror_i^2}{(SafMarg \times MaxThd)^2}$$

in which:

MaxThd designates the predetermined theoretical threshold, $stdUIVDerror_i$ designates the innovation of the IPPi concerned computed in the second step 212;

SafMarg designates the integrity margin as a percentage of the tolerated maximum threshold that one wishes to generate, greater than 0 and strictly less than 1. Preferably, it will be desired to generate a margin lying between 10% and 50% at the maximum. This margin is therefore configured so as to generate an integrity guarantee margin as a relative value, denoted X and expressed as a percentage, according to the expression: SafMarg=(1−X).

The integrity guarantee margin as a relative value X is provided beforehand prior to the execution of the method 202 for optimally fitting the error bounds of the final GIVEs.

The quantity $\Delta_{UIVE_i}$ thus computed satisfies equation #13:

$$SafMarg \times MaxTd = \frac{|VTEC_i - UIVD_i|}{\sqrt{\sigma_{UIVE_i}^2 + \Delta_{UIVE_i}^2 + \sigma_{VTEC_i}^2}}$$

and the square of this quantity $\Delta_{UIVE_i}$ is exactly the value that needs to be added to the variance $\sigma_{UIVE_i}^2$ in order for the integrity to be guaranteed with the configured margin X.

Next, in a sixth step 220, the variance increment computed in the fifth step 218 is distributed or dispersed between the IGPj having served for the computation of the UIVEi of the IPPi considered.

Given that the UIVDi and the UIVEi of an IPPi are obtained by interpolation, this interpolation being normalized according to a normalized function defined by the RTCA DO-229D standard, it is therefore necessary to invert this interpolation in order to redistribute in a perfectly compliant way the $\Delta_{UIVE_i}^2$ computed previously in the fifth step 218.

According to the aforementioned standard, it is recalled that the variance of the UIVEi of the IPPi is obtained through the following expression (equation #14):

$$\Delta_{UIVE_i}^2 = \sum_{k=1}^{N_{IGP}} w_k \cdot \sigma_{GIVE_k}^2$$

in which $N_{IGP}$ is the number of IGPs of the mesh cell or cell of predetermined shape that are used in the computation of the UIVDi and UIVEi of the IPPi considered, this number possibly being 3 or 4, depending on the type of mesh cell used;

k designates a numbering index in the mesh cell containing the IPPi of the IGPs of the said mesh cell, $w_k$ the weight of the IGPk computed by applying the standard according to a function which depends on the distance between the IPPi and the IGPk.

This interpolation being a barycentric interpolation, the sum of the weights $w_k$ is equal to 1, that is to say satisfies the relation: $\Sigma_{k=1}^{N_{IGP}} w_k = 1$ Consequently, the $\Delta_{UIVE_i}^2$ is distributed in the same manner and satisfies the relation (equation #15):

$$\Delta_{UIVE_i}^2 = \sum_{k=1}^{N_{IGP}} w_k \cdot \Delta_{GIVE_k}^2$$

Figure 8:
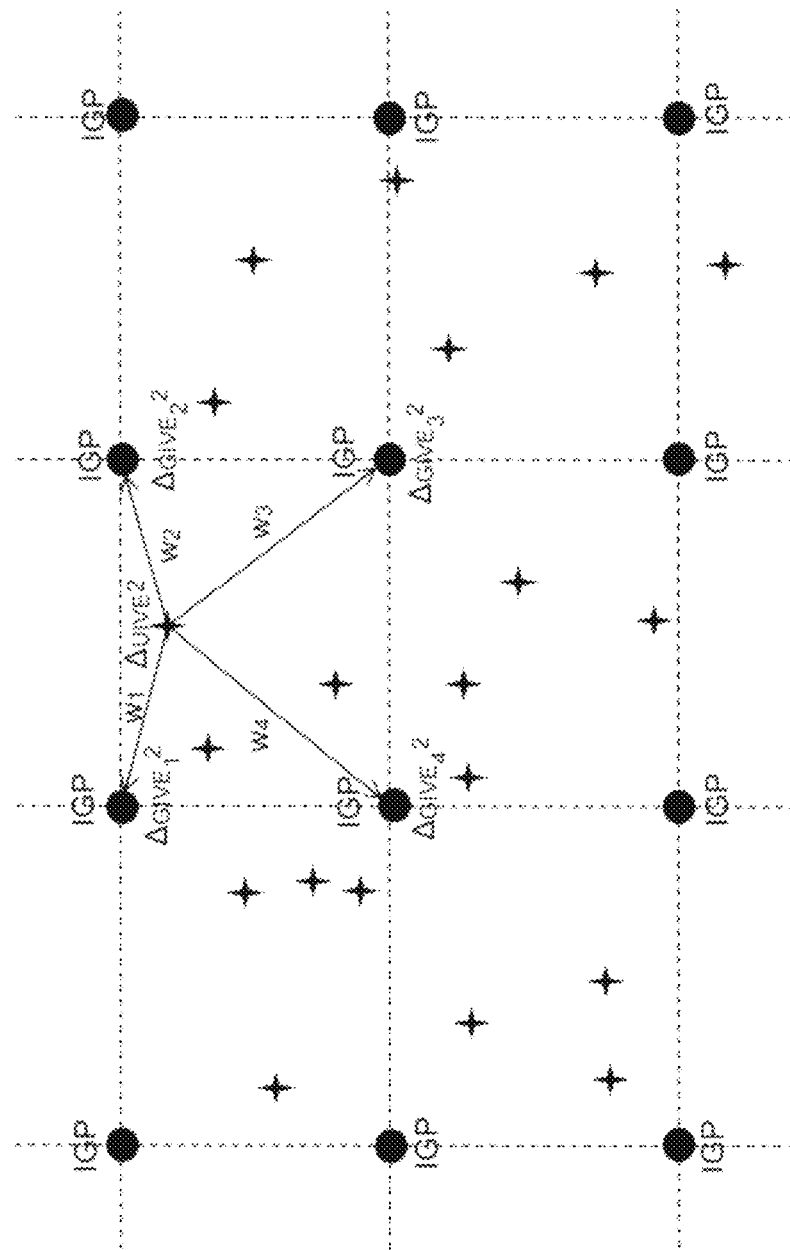
FIG. 8 is a partial view from above according to the invention of an exemplary mesh of the IGPs of the ionospheric correction grid in which the step of inverse interpolation according to the method for optimally fitting the GIVEs of FIG. 7 is implemented by scattering the $\Delta UIVE^2$ as component $\Delta GIVE^2$ over each impacted IGP.

The sixth step 220 is a method for determining the values of $\Delta_{GIVE_k}^2$ to be allocated respectively to the IGPk of the IPPi considered such as described in FIG. 8, which method uses the LS Least Squares scheme to ensure the realization of this partition whatever the conditions.

An observation equation is defined by the expression:

$$Xi = Hi \cdot Yi$$

in which $Hi = [w_1\ w_2\ w_3\ w_4]$ designates a row vector with four components when four IGPs have been used to carry out the interpolation of the IPPi considered, each $w_k$ corresponding to the weight of an $IGP_k$ obtained with the computation scheme defined by the RTCA DO-229D standard for the IPPi considered;

$$Yi = \begin{bmatrix} \Delta_{GIVE_1}^2 \\ \Delta_{GIVE_2}^2 \\ \Delta_{GIVE_3}^2 \\ \Delta_{GIVE_4}^2 \end{bmatrix}$$

designates a column vector with four components of the distribution of the $\Delta_{UIVE_i}^2$ to be distributed over the four IGPk when the mesh cell of the IPPi considered comprises four IGPs, as result of solving the equation;

$Xi = \Delta_{UIVE_i}^2$ designates the quantity to be distributed computed in the fifth step 218.

It should be noted that the case where only three IGPs belonging to a triangular mesh cell are used for the computation of the UIVEi of the IPPi considered, it suffices to readapt the sizes of the vectors Hi and Yi, Hi then having a size [3,1] and Yi a size [1,3].

According to a first embodiment of the sixth step 220 and a first computation scheme, the distributed inflation of the GIVEk is implemented by a Conventional Least Squares scheme (CLSQ, standing for Classical or Conventional Least Squares) in which the distribution Yi of the $\Delta_{UIVE_i}^2$ of the IPPi considered over the associated IGPk is computed in a single sub-step with the aid of equation #16:

$$Yi = Hi^t \cdot (Hi \cdot Hi^t)^{-1} \cdot \Delta_{UIVE_i}^2$$

According to a second embodiment of the sixth step 220 and a second computation scheme, the distributed inflation of the GIVEk is implemented by a Conventional Least Squares scheme followed by a specific fitting of the GIVEk for each IGPk of the point IPPi considered, dependent on a confidence level associated with the said IGPk. This second computation scheme is referred to as least square scheme adjusted through a confidence level (CALSQ, standing for Confidence Adjusted Least Squares).

In this second computation scheme, the same least squares computation scheme is firstly applied according to the same formulation as that used by the first computation scheme:

$$Yi = Hi^t \cdot (Hi \cdot Hi^t)^{-1} \cdot \Delta_{UIVE_i}^2$$

Thereafter, once this first series of $\Delta_{GIVE_k}$ have been obtained, their value is refitted as a function of a confidence level allocated to each IGPk inheriting a $\Delta_{GIVE_k}$, according to a Student's factor whose degree of freedom is equal to the number of IPPs situated in a predetermined neighbourhood of the IGPk concerned minus one by using the expression:

$$\Delta_{GIVE_k}^2 \leftarrow \left(\frac{t_{v_k,\alpha}}{G(p)}\right)^2 \times \Delta_{GIVE_k}^2$$

in which:

$t_{v_k,\alpha}$ designates the Student's factor which gives the confidence with a confidence probability given by a term $\alpha$, that we have with respect to the Gaussian criterion related to the fitting of the GIVEi of the IGPi concerned, and with $v_k$ the degree of freedom of the distribution corresponding here to the number of IPP around an IGP k minus 1; the term a is dependent on a predetermined confidence level (1-p) according to the expression $$\alpha = 1 - \frac{1}{2} \cdot p,$$

p designating the risk of error; for example if we seek to obtain a risk of error of $10^{-7}$, that is to say a confidence level of 0.9999999, $$\alpha = 1 - \frac{1}{2} \cdot 10^{-7};$$

and

G(p) designating the value obtained when the assumption of Gaussian distribution of the error is applied for the same confidence probability (1-p) as that used for the computation of $\alpha$, that is to say the limit of the Student's factor $t_{v_k,\alpha}$ when the degree of freedom $v_k$ tends to infinity; for example if we seek to obtain a confidence level of $(1-10^{-7})$, $$\alpha = 1 - \frac{1}{2} \cdot 10^{-7} \text{ and } G(p) = 5.33.$$

The predetermined neighbourhood of the IGPk can be defined by a predetermined radius.

The implementation of the second computation scheme termed "CALSQ" can be formulated in a condensed manner, by putting:

$$T_i^{CALSQ} = \frac{1}{G(p)^2} \begin{bmatrix} t_{v_1,\alpha}^2 & 0 & 0 & 0 \\ 0 & t_{v_2,\alpha}^2 & 0 & 0 \\ 0 & 0 & t_{v_3,\alpha}^2 & 0 \\ 0 & 0 & 0 & t_{v_4,\alpha}^2 \end{bmatrix}$$

through the following formulation:

$$Yi = T_i^{CALSQ} \cdot Hi^t \cdot (Hi \cdot Hi^t)^{-1} \cdot \Delta_{UIVE_i}^2 \qquad \text{(equation \#17)}$$

It should be noted that this scheme is considered to be conservative because of the fact that the smaller the number of IPPs around an IGP, the more the quantity which will be fitted $\Delta_{GIVE_k}^2$ therein is increased.

According to a third embodiment of the sixth step 220 and a third computation scheme, the distributed inflation of the GIVEk is implemented with a redistribution according to the confidence levels assigned to the IGPk associated with the IPPi considered. This third computation scheme is referred to as the least squares scheme weighted by the confidence levels (CWLSQ, standing for Confidence Weighted Least Squares).

In this third computation scheme, we firstly compute the same Student's factors $t_{v_k,\alpha}$ as those computed in the second computation scheme, associated respectively with the IGPk of the IPPi considered.

Next, on the basis of the Student's factors $t_{v_k,\alpha}$ computed, a diagonal matrix Pi is constructed by putting:

$$Pi = \begin{bmatrix} q_1 & 0 & 0 & 0 \\ 0 & q_2 & 0 & 0 \\ 0 & 0 & q_3 & 0 \\ 0 & 0 & 0 & q_4 \end{bmatrix}$$

with $$q_k = \left(\frac{t_{v_k,\alpha}}{G(p)}\right)^2$$

associated with the IGPk, k varying from 1 to $N_{IGP}$.

It will be noted that this matrix Pi is of size 4×4 when four IGPk are used for the interpolation of the delay at the IPPi. If only three IGPk are used, it will be a 3×3 matrix.

Thereafter, the vector Yi of distribution of the $\Delta_{UIVE_i}^2$ of the IPPi considered over the associated IGPk is computed according to the following formulation of the "CWLSQ":

$$Yi = Pi \cdot Hi^t \cdot (Hi \cdot Pi \cdot Hi^t)^{-1} \cdot \Delta_{UIVE_i}^2 \quad \text{(equation \#18)}$$

Here, with this third computation scheme, we obtain a slight redistribution of the $\Delta_{UIVE_i}^2$ as a function of the confidence level that we have on each IGPk. Thus, if an IGPk is far distant from the IPPi but if the number of IPP in the neighbourhood of the said IGPk is small, its GIVEk will be increased in a more significant manner than in the "CLSQ" formulation of the first computation scheme to the detriment of the IGPk closest to the IPPi tested.

According to a fourth embodiment of the sixth step 220 and a fourth computation scheme, the distributed inflation of the GIVEk is implemented with a fit of the confidence associated with the $\Delta_{UIVE_i}^2$. This fourth scheme is referred to as the Least Squares scheme adjusted by residual confidence level ARCLSQ (standing for Adjusted Residual Confidence Least Squares).

This fourth computation scheme entails evaluating a mean confidence level that will be applied directly to the $\Delta_{UIVE_i}^2$ before redistributing it between the IGPk.

In this fourth computation scheme, the degree of freedom of Student's distribution law is firstly estimated by a number $Nb_{IPP\_MEAN}$, computed on the basis of the weighted sum of the number of IPP in the neighbourhood of the IGPk having served in obtaining the UIVDi and UIVEi of the IPPi tested, according to the formula:

$$Nb_{IPP\_MEAN} = \frac{\sum_{k=1}^{N_{IGP}} w_k \cdot (Nb_{IPP\_k} - 1)}{\sum_{k=1}^{N_{IGP}} w_k} \quad \text{(equation \#19)}$$

with:
- $w_k$, the weight of the IGPk obtained by applying the interpolation scheme defined by the RTCA DO-229D standard to the IPPi concerned to obtain its UIVDi and UIVEi;
- $Nb_{IPP\_k}$ corresponds to the number of IPP situated around the IGPk in the neighbourhood consisting of the union of all the cells containing this IGPk.

Next, the associated Student's factor $t_{Nb_{IPP\_MEAN},\alpha}$ is computed.

Thereafter, the vector Yi of distribution of the $\Delta_{UIVE_i}^2$ of the IPPi considered over the associated IGPk is computed according to the following formulation of the "ARCLSQ":

$$Yi = Hi^t \cdot (Hi \cdot Hi^t)^{-1} \cdot \left[\Delta_{UIVE_i}^2 \cdot \left(\frac{t_{Nb_{IPP\_MEAN},\alpha}}{G(p)}\right)^2\right] \quad \text{(equation \#20)}$$

Thereafter, in a seventh step 222 subsequent to the sixth step 220, for each IGPk of the mesh cell to which the IPPi considered belongs, the variance of the $GIVE_k$ of the said IGPk is updated by replacing the current value $\sigma_{GIVE_k}$ of the GIVEk with the expression $\sqrt{\sigma_{GIVE_k}^2 + \Delta_{GIVE_k}^2}$ for a new value of the GIVEk, which may also be written:

$$\sigma_{GIVE_k} \leftarrow \sqrt{\sigma_{GIVE_k}^2 + \Delta_{GIVE_k}^2}$$

Next, in an eighth step 224, for each IGPk of the tested IPPi concerned, the new value of the GIVEk is quantized according to a scale of tiers defined in the RTCA DO-229D standard, all versions up to and including the current version E, in which a maximum tier is fixed at the integer value 15.

Thereafter, in a ninth test step 226, the quantized values of the GIVEk, associated respectively with the IGPk of the IPPi tested, are each compared with the integer threshold value equal to 14.

When, among the quantized values of the GIVEk, there exists a GIVEk exceeding the threshold value of 14, in a tenth step 228, the quantized value or values of the GIVEk which exceed the threshold value of 14 are set to the integer end-stop value of 15, followed by a branch to the fourth step 216 of testing for the end of the second local scan loop for the IPPi contained in the mesh cell of rank m.

When, among the quantized values of the GIVEk there does not exist any GIVEk exceeding the threshold value of 14, the quantized values of the GIVEk remain as is and a direct branch to the fourth step 216 is performed.

In the course of the execution of the fourth step 216, it is verified whether all the IPPi contained in the cell of current rank m have been tested.

If not all the IPPi of the cell of current rank m have been tested, an as yet untested IPPi of the cell of current rank m is tested in the second local scan loop, the index i of the untested IPPi becoming the new index of the IPPi to be tested, and the fifth, sixth, seventh, eighth, ninth steps are repeated.

If all the IPPi of the cell of current rank m have been tested, an eleventh step 230 is executed in the course of which the scan rank m for scanning through the cells according to the predetermined pattern is incremented by one unit. After the eleventh step 230, a twelfth step 232 of testing for the end of the first loop is implemented in the course of which it is verified whether the incremented scan index m of the cells exceeds the rank of the last cell of the scan pattern.

When the incremented scan index m of the cells does not exceed the rank of the last cell of the scan pattern, that is to say when the incremented scan index m is less than or equal to the scan index of the last cell of the pattern, i.e. the pattern's cell programmed to be swept last, the incremented scan index m of the first loop becomes the current scan index of the first loop, for each IPPi contained in the cell of current rank m in the order of scanning of the first loop, the steps of the second local loop are executed.

When the incremented scan index m of the cells exceeds the rank of the last cell of the scan pattern, the method illustrated in FIG. 7 is terminated.

The predetermined scan pattern for the cells is defined by a given sweep strategy for the grid portion corresponding to the SBAS service area.

A sweep strategy defines a scheme making it possible to perform the looping over the set of IGPs of the portion according to the first loop, the ideal being to begin in an area inside which one is least liable to trigger an inflation of the GIVEs.

Figure 9:
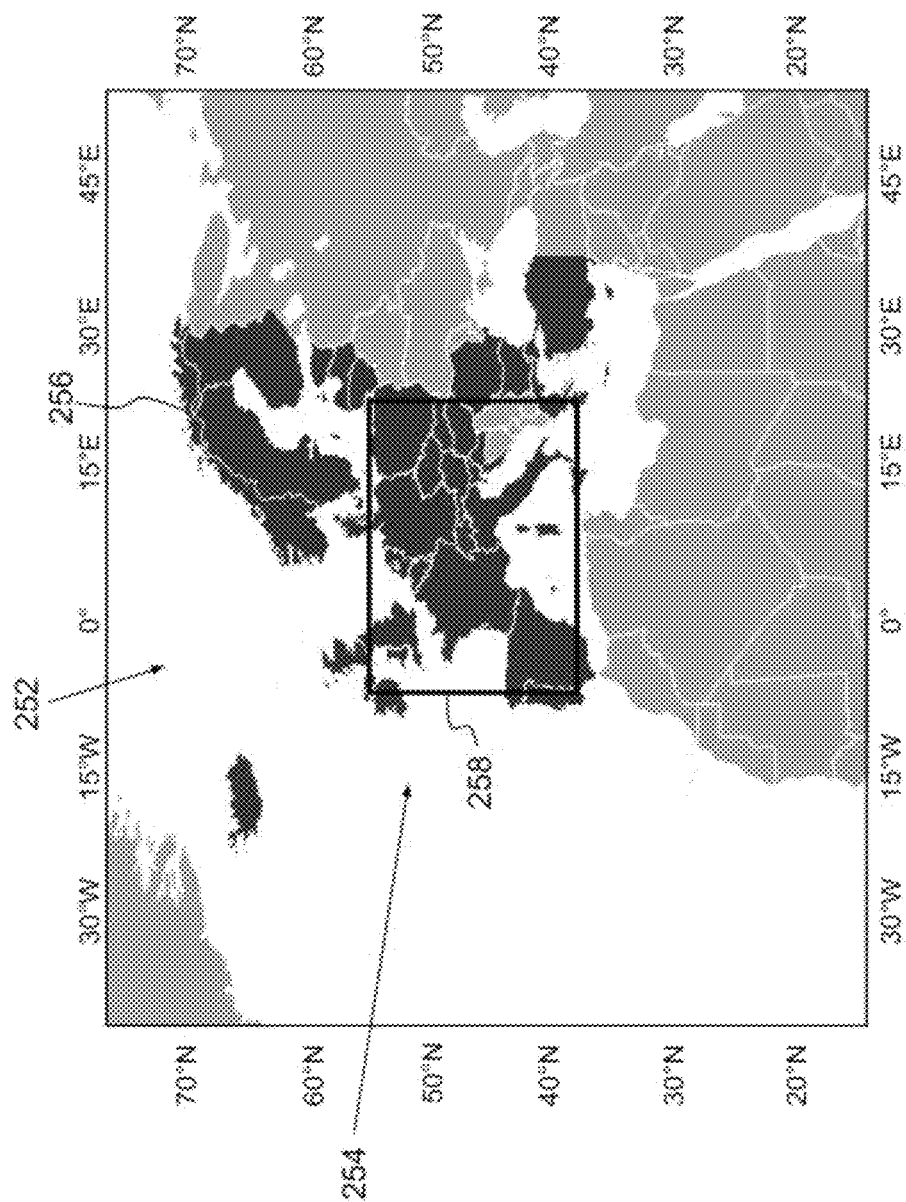
FIG. 9 is a view of an example of an area of coverage of the EGNOS European augmentation system.

According to FIG. 9, a map 252 represents the area of coverage 254 of the EGNOS system, with in particular the countries 256 shown hatched for which the EGNOS mission applies.

According to a first sweep strategy, the cell with which the sweep process will begin is firstly determined in a central area, marked by a bold frame 258 in FIG. 9.

This starting cell is defined, either as the most central cell with respect to the centre of the service area of the system which is generally a good indicator, or the cell containing the IGPs for which the sum of the GIVEs is smallest.

Once this starting cell has been located, we iterate on the adjacent cells, always beginning with the cell containing the most IPP. When the number of IPP contained in two adjacent cells is the same, the cell situated most to the South is chosen if the latitude of the bottom-most IGP of the cell is less than 50°, otherwise the northern-most cell is chosen.

When the service area is situated in the southern hemisphere, the first strategy for defining a scan of the cells inverts in a complementary manner the directions considered and described previously when the service area is situated in the northern hemisphere.

Figure 10:
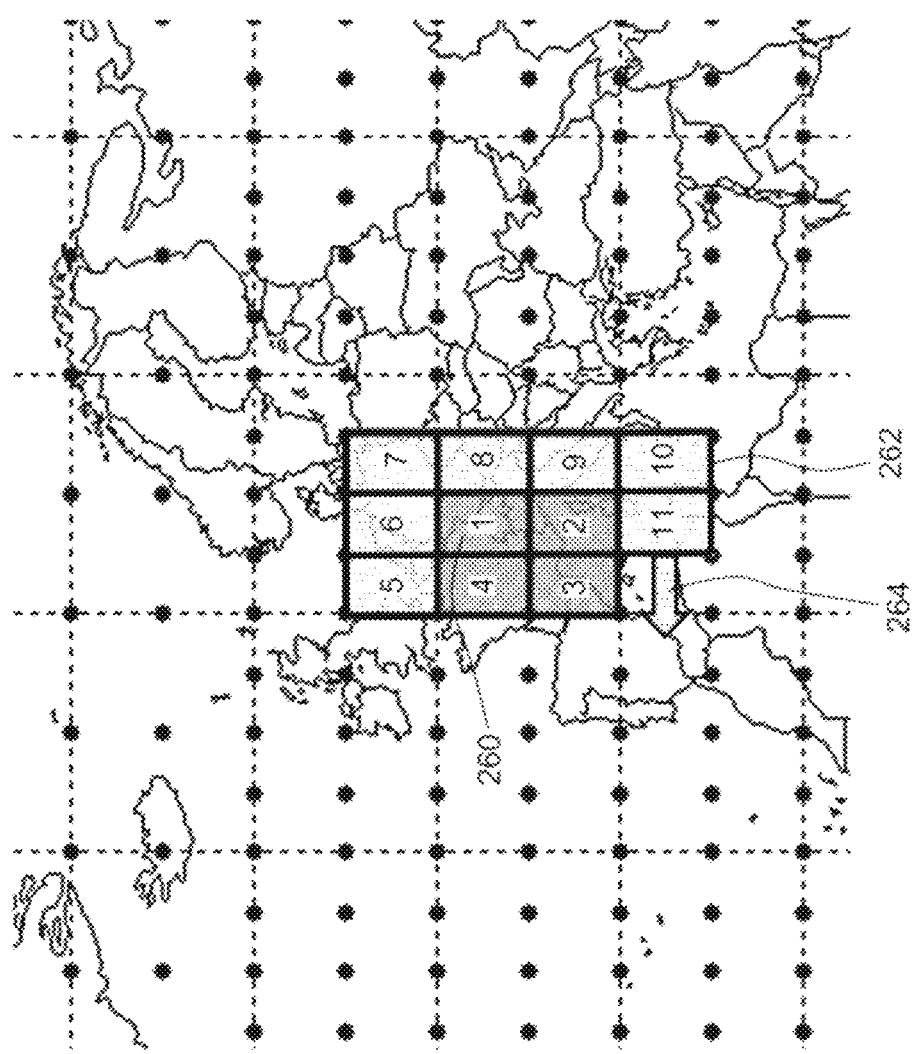
FIG. 10 is a view of an exemplary sweep according to the invention of the mesh cells of the service area of FIG. 9.

According to FIG. 10 and a second sweep strategy, which is simpler to implement than the first sweep strategy, the starting cell is determined in the same manner as in the first sweep strategy, and the order of scanning of the following cells is thereafter fixed by a spiral-shaped pattern 262 winding clockwise around the central cell. The direction of scan 264 of this spiraled cellular pattern is centrifugal. The scan pattern is illustrated partially in FIG. 10 by the commencement of a string of cells numbered from 1 to 11, starting from the central cell numbered with the number 1.

The two iterative schemes illustrated in FIGS. 9 and 10 are merely two examples of cell sweep strategy, it being possible to envisage variants of these strategies. The very principle of doing a cell-wise sweep to control their integrity is considered to form part of the invention.

The integrity control method defined hereinabove makes it possible not only to verify initially whether the integrity is adhered to but affords above all the capacity to steer the GIVEs of the IGPs at any time with an optimal value for each of them which considerably minimizes the risk of barring the use of an IGP if its GIVE does not make it possible to ensure integrity at the level of a line of sight at the time of control.

An SBAS satellite-based augmentation system for augmenting the performance of a global navigation satellite system GNSS, configured to execute the first method 202 for optimally fitting the GIVEs of FIG. 7, comprises SBAS service(s) user terminals, one or more satellites for augmenting the satellites of the GNSS system and for broadcasting information messages to the user terminals, one or more RIMS observation stations furnished with GNSS receivers, and one or more computers.

The SBAS system is configured to fit in an optimal manner ionospheric correction error bounds, called final GIVEs, of a first set of IGP points of an ionospheric correction grid for a service area of the SBAS system, the ionospheric correction grid being structured as a meshed network of cells of predetermined polygonal shape, the cells of the meshed network corresponding projectively to the SBAS service area and having as vertices IGP points of the first set.

The electronic computer or computers of the SBAS system are configured to:

on the basis of predetermined information in respect of ionospheric error correction of the IGP points of the first set, and of measurements of pseudo-distances of a second set of control and observation pierce points IPP which are contained in the cells of the ionospheric grid, for each observation pierce point IPPi of the second set, an innovation designated by $stdUIVDerror_i$, according to the expression:

$$stdUIVDerror_i = \frac{|VTEC_i - UIVD_i|}{\sqrt{\sigma_{VTEC_i}^2 + \sigma_{UIVE_i}^2}}$$

in which:
$VTEC_i$ designates the vertical ionospheric delay measured at the IPP
$UIVD_i$ designates the vertical ionospheric delay interpolated on the basis of the GIVDj of the IGPj of the mesh cell of rank m surrounding the IPPi concerned;
$\sigma_{VTEC_i}$ designates the standard deviation of the measurement noise at the IPPi,
$\sigma_{UIVE_i}$ designates the standard deviation arising from the GIVEs of the IGPj of the mesh cell of rank m having participated in the interpolation of the UIVDi of the IPPi concerned; and then
when the innovation of the IPPi scanned in the current mesh cell of rank m is strictly greater than a theoretical threshold MaxThd corresponding to predetermined confidence or integrity level required by the SBAS service, compute a variance increment $\Delta_{UIVE_i}^2$ that would need to be added to the $\sigma_{UIVE_i}^2$ on the IPPi considered in order for it to cover the integrity level required according to the equation:

$$\Delta_{UIVE_i}^2 = (\beta + \sigma_{UIVE_i}^2) \times (K_{fact}^2 - 1)$$

in which:
$\sigma_{UIVE_i}$ designates the standard deviation arising from the GIVEs of the IGPj of the mesh cell of rank m having participated in the interpolation of the UIVDi of the IPPi concerned;
$\beta$ and $K_{fact}^2$ designate respectively a first term and a second term.

The first term $\beta$ being determined according to the equation:

$$\beta = \sigma_{VTEC_i}^2$$

where $VTEC_i$ designates the vertical ionospheric delay measured at the IPPi considered, and
the second term $K_{fact}^2$ being determined according to the equation:

$$K_{fact}^2 = \frac{stdUIVDerror_i^2}{(SafMarg \times MaxThd)^2}$$

SafMarg designating the integrity margin as a percentage value that one wishes to generate which is positive and strictly less than 1, and which is configured as a function of an integrity guarantee margin as a predetermined relative value, denoted X and expressed as a percentage, according to the expression: SafMarg=(1−X) (for example, if it is desired to generate an integrity margin of 15%, then X=0.15 and .SafMarg=0.85); and then when the innovation of the IPPi scanned in the current mesh cell of rank m is strictly greater than a theoretical threshold MaxThd:

determine values of variance increments $\Delta_{GIVE_k}^2$ to be allocated respectively to the IGPk of the mesh cell of the IPPi considered by an inverse interpolation scheme using a Least Squares scheme so as to distribute the variance increment $\Delta_{UIVE_i}^2$ of the IPPi according to the relation:

$$\Delta_{UIVE_i}^2 = \sum_{k=1}^{N_{IGP}} w_k \cdot \Delta_{GIVE_k}^2$$

in which $N_{IGP}$ is the number of IGPs of the mesh cell of predetermined shape that are used in the computation of the UIVDi and UIVEi of the IPPi considered;

k designates a numbering index in the mesh cell containing the IPPi of the IGPs of the said mesh cell, $w_k$ designate the respective weights of the IGPk, k varying from 1 to $N_{IGP}$, computed by applying the GNSS standard according to a function of the GNSS standard which depends on the distance between the IPPi and the IGPk, the sum of the weights $w_k$ being equal to one; and then for each IGPk of the mesh cell m to which the IPPi considered belongs, update the variance $GIVE_k$ of the said IGPk by replacing the current value $\sigma_{GIVE_k}$ of the GIVEk with a new value equal to $\sqrt{\sigma_{GIVE_k}^2 + \Delta_{GIVE_k}^2}$.

Figure 11:
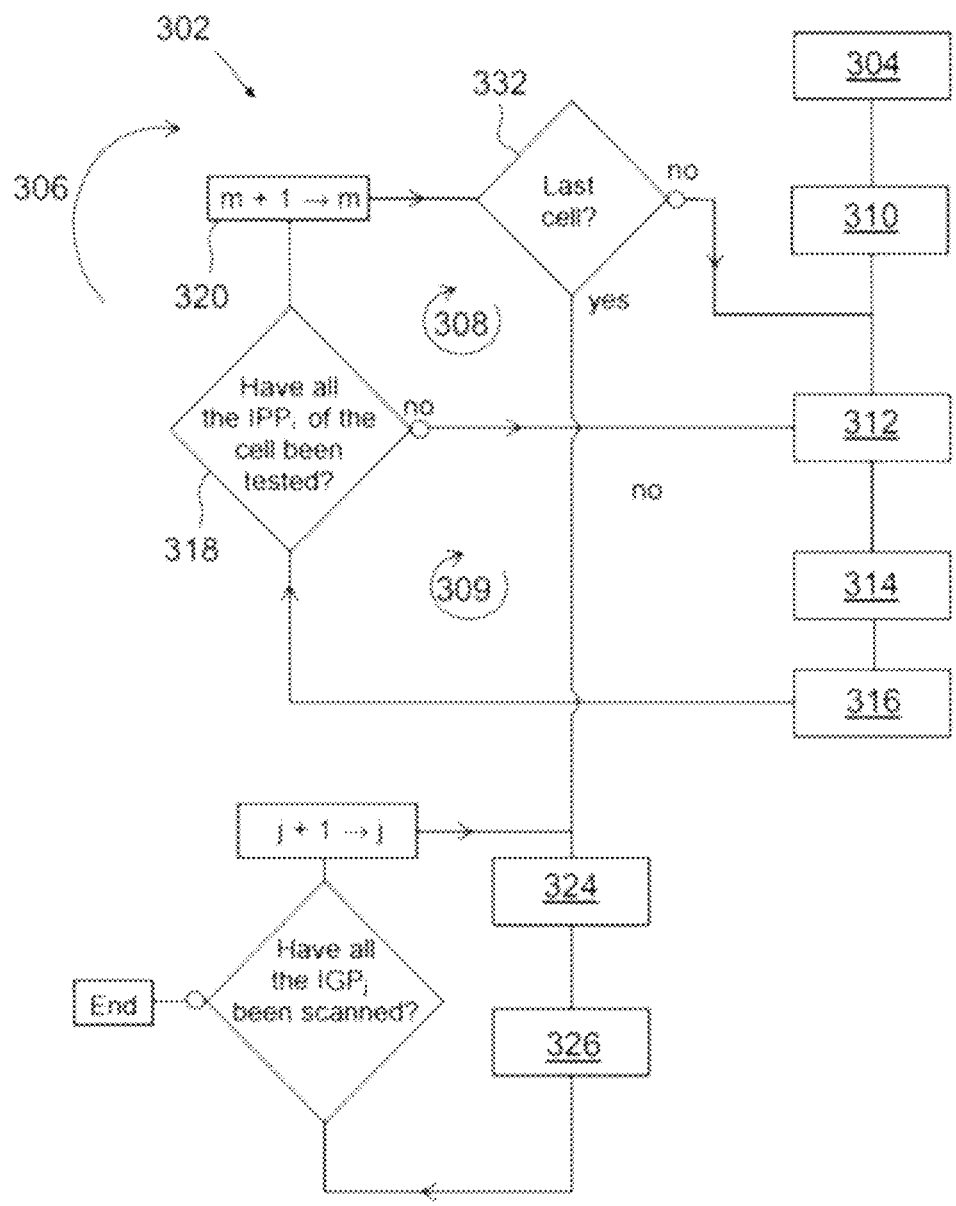
FIG. 11 is a flowchart for optimal computation according to the invention of the variances $\sigma_{MOPS}^2$ of the residuals of a first set of IGP points of an ionospheric correction grid for a service area of an SBAS system

According to FIG. 11 and the second invention, a second method 302 for optimized computation of the standard deviations of residuals, called $\sigma_{MOPS}$, or of the variances $\sigma_{MOPS}^2$ of residuals, in the particular case where the operating standard of the user terminal is the MOPS standard, which are associated with a first set of points IGPj of an ionospheric correction grid for a service area of an SBAS system, is now described.

The standard deviations $\sigma_{MOPS}$ make it possible to model the error of interpolation carried out between the IGPs and the pierce point of the signal received by the user, and the error of the rabattement function for mapping the vertical delay to the slant delay fixed here by the MOPS standard, the said standard deviations $\sigma_{MOPS}$ being involved in the computation of the initial GIVEs, and as a consequence the final GIVEs of the IGPs, determined according to the first method. It is recalled that the IGPs ensure the integrity of a predetermined SBAS service and calculate the ionospheric error corrections serving in the interpolation computation in respect of the errors performed by the user terminals according to the standard defining the operating algorithms of the said user terminals.

The computation of the term $\sigma_{MOPS}$ involved in the construction of the initial GIVE and implemented by the second method 302 uses in the manner of the first method for fitting the final GIVEs a scheme for inverse interpolation of the IPPs to the IGPs so as to ensure here the equitable distribution of the residuals, and which is similar to that used for the determination of the $\Delta_{UVDE}$ of the IGPs, is now described.

This computation scheme therefore broadly reuses the distribution concept used within the framework of the first invention. Moreover, the final construction of the $\sigma_{MOPS}$ is ensured by an optimal computation reusing the set of residuals for which the IGP concerned is involved, thus allowing optimal fitting of the computation of the $\sigma_{MOPS}$.

Just as for the computation of the $\Delta_{UVDE}$ of the IGPs, we have found here the scheme ensuring the optimal fitting of the value of $\sigma_{MOPS}$ whatever the configuration of the IPPs around the IGPs.

According to FIG. 11, the method for computing the standard deviations called $\sigma_{MOPS}$, or variances $\sigma_{MOPS}^2$ of the residuals, associated with a first set of points IGPj of an ionospheric correction grid for a service area of an SBAS system is implemented by one or more computers, on the basis on the one hand of information in respect of ionospheric-error corrections calculated for the said points IGPj of the first set, j designating an integer index for identifying and scanning the said points IGPi of a portion of the ionospheric grid, structured as a meshed network of cells having a predetermined shape and corresponding to the SBAS service area, and on the basis on the other hand of information in respect of measurements of pseudo-distances of a second set of control pierce points IPPi which are contained in the cells of the service portion of the ionospheric grid, the measurements of pseudo-distances being performed by so-called RIMS control and telemetry stations.

The points IGPj of the ionospheric grid portion corresponding to the coverage of the SBAS service area, forming a meshed network whose mesh cells have one and the same predetermined shape, this shape being included among triangular shapes and quadrilateral shapes, preferably rectangular, square or lozenge shapes.

The provision of the information in respect of ionospheric-error corrections calculated for the said points IGPj of the first set and of the information in respect of measurements of pseudo-distances of the second set of control pierce points IPPi is implemented in the course of a prior step of calculating and providing the said information 304 forming a step of initialization 304 of the second method for optimally computing the $\sigma_{MOPS}$.

In contradistinction to what is done in the method of the prior art, the second method 302 according to the invention does not perform any IGP-wise computation of standard deviations called $\sigma_{MOPS}$ by scanning through a scan loop for the IGPs on the first set, but performs IPP-wise integrity verification tests by scanning a global scan loop 306 for the IPPi on the second set.

The IPPi of the first set are partitioned into their membership cells or mesh cells and the global scan loop 306 for the IPPi comprises a first loop 208 for scanning the cells of the grid portion according to an order or a scan pattern which is predetermined, and comprises, nested in the first loop 308 for scanning the cells, a second local loop 309 for scanning the IPPi belonging to one and the same cell of the ionospheric grid portion.

The method 302 for optimally computing the standard deviations $\sigma_{MOPS}$ by finals comprises a set of steps executed after the prior step 304.

In a first step 310, a first commencing and initializing cell for first loop 308 is selected according to the initial rank that it occupies in the predetermined scan pattern for the cells. The scan index of the first loop being designated by m, the index m is set to 1 and corresponds to the initial rank 1 of the first cell of the pattern.

Next, for each IPPi contained in the cell of current rank m in the order of scanning of the first loop, the following steps are executed.

In a second step 312, for the relevant IPPi of rank i contained in the cell of current rank m, a residual, designated by $Res_i$, referred to the vertical, is computed according to equation #21:

$$Res_i = \frac{STEC_i - UISD_i}{F_{pp\ standard}}$$

in which:

$STEC_i$ designates the ionospheric delay of the real line of sight, therefore dependent on the elevation;

$UISD_i$ designates the vertical ionospheric delay interpolated according to the standard on the basis of the $GIVD_k$ of the $IGP_k$ of the mesh cell or cell surrounding the IPPi;

$F_{pp\ standard}$ designates the standard rabattement function for mapping the ionospheric delay as a function of the elevation of the line of sight.

In the same second step 312, the square of the residual $Res_i^2$ is computed.

Next, in a third step 314, the square of the residual computed $Res_i^2$ is distributed or dispersed between the $IGP_j$ having served for the computation of the $UISD_i$ of the IPPi considered.

Given that the square of the residual of an IPPi is obtained by interpolation, this interpolation being normalized according to a normalized function defined by the RTCA DO-229E standard, it is therefore necessary to invert this interpolation in order to redistribute in a perfectly compliant manner the square of the residual $Res_i^2$, previously computed in the second step 312.

The square of the residual $Res_i^2$ must be governed by the following equation #22:

$$Res_i^2 = \sum_{k=1}^{N_{IGP}} w_k \cdot \Delta_{Resk}^2$$

in which $N_{IGP}$ is the number of IGPs of the mesh cell of predetermined shape that are used in the computation of $Res_i^2$ of the IPPi considered, this number possibly being 3 or 4, depending on the type of mesh cell used;

k designates a numbering index in the mesh cell containing the IPPi of the IGPs of the said mesh cell, $w_k$ the weight of the $IGP_k$ computed by applying the standard according to the computation scheme defined in the standard.

Figure 12:
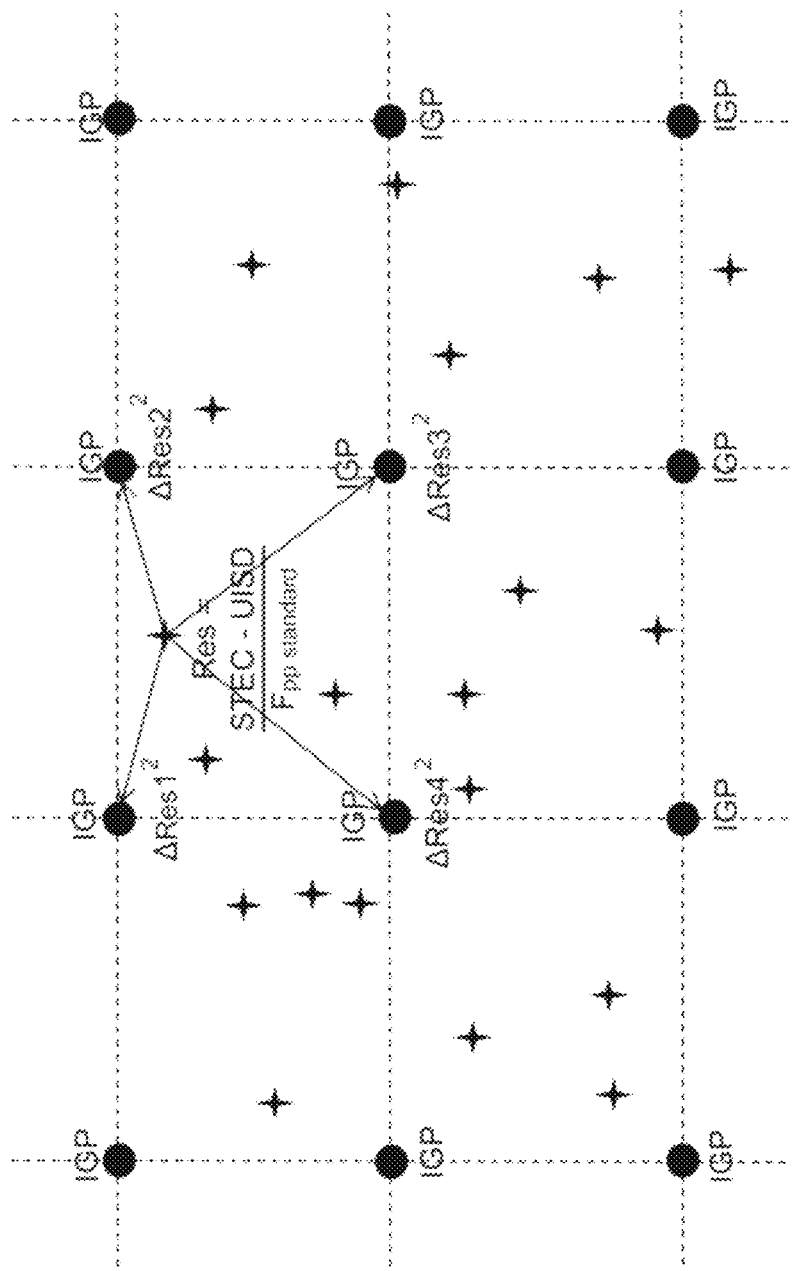
FIG. 12 is a partial view from above according to the invention of an exemplary mesh of the IGPs of the ionospheric correction grid, in which the step of inverse interpolation according to the method for optimally computing the variances $\sigma_{MOPS}^2$ of the residuals of FIG. 11 is implemented by dispersing the residual of an IPP over the IGPs of the mesh cell of the said IPP.

This interpolation being a barycentric interpolation, the sum of the weights $w_k$ is equal to 1, that is to say satisfies the relation: $\Sigma_{k=1}^{N_{IGP}} w_k = 1$ The third step 314 is a method for determining the values of $\Delta_{Resk}^2$ to be allocated respectively to the $IGP_k$ of the IPPi considered such as described in FIG. 12, which method uses the LS Least Squares scheme to ensure the realization of this partition whatever the conditions.

An observation equation is defined by the expression:

$$Xi = Hi \cdot Yi \quad \text{(equation \#23)}$$

in which $Hi=[w_1\ w_2\ w_3\ w_4]$ designates a row vector with four components when four IGPs have been used to carry out the interpolation of the IPPi considered, each $w_k$ corresponding to the weight of an $IGP_k$ obtained with the computation scheme defined here by the RTCA DO-2290 standard of the EGNOS system, all versions up to and including the current version E, for the IPPi considered;

$$Yi = \begin{bmatrix} \Delta_{Res1}^2 \\ \Delta_{Res2}^2 \\ \Delta_{Res3}^2 \\ \Delta_{REes4}^2 \end{bmatrix}$$

designates a column vector with four components of the distribution of the square of the residual $Res_i^2$ to be distributed over the four $IGP_k$ when the mesh cell of the IPPi considered comprises four IGPs, as result of solving the equation;

$Xi = Res_i^2$ designates the quantity to be distributed computed in the second step 312.

It should be noted that the case where only three IGPs belonging to a triangular mesh cell are used for the computation of the $UISD_i$ of the IPPi considered, it suffices to readapt the sizes of the vectors Hi and Yi, Hi then having a size [3,1] and Yi a size [1,3].

The LS Least Squares scheme implemented in the third step determines the column vector Yi and solves the observation equation with the aid of the formula:

$$Yi = Hi^t \cdot (Hi \cdot Hi^t)^{-1} \cdot Res_i^2 \quad \text{(equation \#24)}$$

Thereafter, in a fourth step 316, a weighting coefficient pi as inverse of a weight is computed, this coefficient being representative of the quality of the measurement of the $STEC_i$ rectified into $VTEC_i$ by dividing by the rabattement function for mapping the IPPi considered, and expressed according to the following formula:

$$p_i = \frac{\sigma_{VTEC_i}^2}{\sigma_{VTEC\ NOMINAL}^2}$$

in which $\sigma_{VTEC_i}^2$ designates the measurement noise in respect of the pseudo-distance measured by the measurement terminal for the IPPi considered, and $\sigma_{VTEC_iNOMINAL}^2$ designates a nominal reference measurement noise of the measurement terminal.

The squares of the residuals $\Delta_{Resk}^2$ and the weight 1/pi associated with the IPPi considered are recorded in a saving memory.

Next, in a fifth step 318, it is verified whether all the IPPi contained in the cell of current rank m have been tested.

If not all the IPPi of the cell of current rank m have been tested, an as yet untested IPPi of the cell of current rank m is tested in the second local scan loop, the index i of the untested IPPi becoming the new index of the IPPi to be tested, and the second, third, fourth, fifth steps are repeated.

If all the IPPi of the cell of current rank m have been tested, a sixth step 320 is executed in the course of which the scan rank m for scanning through the cells according to the predetermined pattern is incremented by one unit.

After the sixth step 320, a seventh step 322 of testing for the end of the first loop is implemented in the course of which it is verified whether the incremented scan index m of the cells exceeds the rank of the last cell of the scan pattern.

When the incremented scan index m of the cells does not exceed the rank of the last cell of the scan pattern, that is to say when the incremented scan index m is less than or equal to the scan index of the last cell of the pattern, i.e. the pattern's cell programmed to be swept last, the incremented scan index m of the first loop becomes the current scan index of the first loop, for each IPPi contained in the cell of current rank m in the order of scanning of the first loop, the steps of the second local loop are executed again.

When the incremented scan index m of the cells exceeds the rank of the last cell of the scan pattern, an eighth step 324 followed by a ninth step 326 of computing the standard deviations of the IGPs of the service area is implemented for each IGP on the basis of an associated inherent list containing the residual portions of the IPPs having generated a residual for the IGP considered and the weights 1/p to be associated.

Considering a given IGP, the standard deviation $\sigma_{MOPS}$ is computed in the eighth step 324 according to equation #25:

$$\sigma_{MOPS} = \sqrt{\frac{1}{P_S} \times \sum_{i=1}^{N_{ipp}} \frac{1}{p_i} \times \Delta^2_{Res_{ippi}}}$$

with:

$P_S$, the sum of the normalized weights $1/p_i$ of each residual that are available for the following IGP considered:

$$P_S = \sum_{i=1}^{N_{ipp}} \frac{1}{p_i}$$

$N_{ipp}$ being the number of IPPs having generated a residual for the IGP concerned, $\Delta_{Res_{ipp\,i}}^2$ the residual interpolated as inverse at the IGP considered for the IPPi forming part of the IPPs having generated a residual for the IGP concerned.

In contradistinction to the conventionally used methods, the weights 1/pi are defined here solely as a function of the quality of the STEC measurement obtained on each IPP having generated a residual for the IGP concerned.

In the ninth step 326, the value of the $\sigma_{MOPS}$ computed in the eighth step 324 for the IGP considered is expanded according to the number of IPPi having contributed to its estimation by a Student's factor making it possible to define the confidence index of the value measured with respect to a Gaussian assumption so as to obtain a new value of $\sigma_{MOPS}$ according to the expression:

$$\sigma_{MOPS} \leftarrow \left(\frac{t_{v_k, 0.99999995}}{5.33}\right) \times \sigma_{MOPS}$$

with:

$t_{v_k, 0.99999995}$ the Student's factor as a function of $v_k$, the degree of freedom (here it is the number of IPP) making it possible to bound an error with a probability of $10^{-7}$ required by the aeronautical standard; and 5.33 which is the value obtained when the Gaussian assumption is applied, for the same probability as that defined hereinabove, that is to say 0.999999995 of confidence.

When the loop for computing the standard deviations $\sigma_{MOPS}$ of the IGPs has scanned through all the IGPs of the area of the SBAS service, the second method for computing the $\sigma_{MOPS}$ is stopped.

As a variant and in a manner equivalent to the execution of the eighth and ninth steps 324, 326, for an IGP considered it is possible to compute the $\sigma_{MOPS}$ on the basis of a weighted Least squares scheme using as inverse pi of weight for each relevant IPPi having generated a residual for the IGP considered, it being possible for the expression for such a weight inverse to be:

$$p_i = \frac{1}{w_i} \times \sigma^2_{VTEC_i} \text{ or } p_i = \frac{1}{w_i} \times \frac{\sigma^2_{VTEC_i}}{\sigma^2_{VTEC\,NOMINAL}},$$

the inverse pi of the weight being representative of the measurement quality associated with the IPP considered, and $w_i$ being the weight of the IPPi according to the IGP such as defined by the DO-229 standard.

The weight $w_i$ can also be computed and modified into a weight dependent on the significance that one wishes to accord to the positioning of the IPPs. For example, a weighting denoted $w_{i\,center\,norm}$, attaining the most significant weight at the centre of the cell used for the bilinear interpolation, is applied, since it is here that the maximum of the interpolation errors are assumed to be concentrated.

The weight $w_{i\,center\,norm}$ then used, corresponding to the fit at the centre of the cells, is computed on the basis of the weights on determined according to the MOPS-DO-229 standard as follows.

A first modified weight $w_{i\,center\,ini}$ is computed for each non-zero weight of the IPP i having been used for the interpolation according to the formula:

$$w_{i\,center\,ini} = \left|w_i - \frac{1}{N_{IGP}}\right|$$

Next, the weight $w_{i\,center\,norm}$ used is computed according to the formula:

If $w_i = 0$, then the IPP is not used for the computation of the $\sigma_{MOPS}$ of the IGP considered If $$0 < w_i < \frac{1}{N_{IGP}}, \text{ then } w_{i\,center\,norm} = w_i$$

Otherwise $$w_{i\,center\,norm} = 1 - \frac{w_{i\,center\,ini}}{\sum_{i=1}^{N_{IGP}} w_{i\,center\,ini}},$$

in which $N_{IGP}$ corresponds to the number of IGP having served in the interpolation of the ionospheric delay at the IPPi. In this case the expression for the weight inverse pi for each relevant IPPi having generated a residual for the IGP considered, may be written:

$$p_i = \frac{1}{w_{i\,centre\,norm}} \times \sigma^2_{VTEC_i} \text{ or}$$

$$p_i = \frac{1}{w_{i\ centre\ norm}} \times \frac{\sigma^2_{VTEC_i}}{\sigma_{VTEC\ NOMINAL}^2}.$$

Designating by P a diagonal weighting matrix of dimension equal to the number $N_{ipp}$ of the IPPs having generated residuals for the computation of the $\sigma_{MOPS}$ of the IGP considered, we put:

$$P = \begin{bmatrix} \frac{1}{p_1} & \cdots & 0 \\ \vdots & \ddots & \vdots \\ 0 & \cdots & \frac{1}{p_{N_{ipp}}} \end{bmatrix}$$

We designate by K the observation matrix of size $N_{ipp} \times 1$ and defined by: K=[1 . . . 1]

With the matrix of the residuals of size $1 \times N_{ipp}$ denoted Z and defined by:

$$Z = \begin{bmatrix} \Delta^2_{Res_{ipp_1}} \\ \vdots \\ \Delta^2_{Res_{ippN_{ipp}}} \end{bmatrix}$$

the computation of the standard deviation $\sigma_{MOPS}$ of the IGP considered may finally be written in an equivalent manner by the expression:

$$\sigma_{MOPS} = \left(\frac{t_{v_k,0.99999995}}{5.33}\right) \cdot \sqrt{(K \cdot P \cdot K^t)^{-1} \cdot K \cdot P \cdot X^t} \quad \text{(equation \#25)}$$

with:

$t_{v_k,0.99999995}$, the Student's factor having $(N_{ipp}-1)$ degrees of freedom for a risk of $10^{-7}$.

It should be noted that the expansion factors considered hereinabove for the various forms of computation of the $\sigma_{MOPS}$ correspond to the particular case of a confidence level taken equal to $10^{-7}$, appropriate to certain aeronautical services.

Generally, the expansion factor for $\sigma_{MOPS}$, denoted $d_k$ is equal to $$\left(\frac{t_{v_k,\alpha}}{G(p)}\right)$$

with:

$t_{v_k,\alpha}$ designating the Student's factor dependent on $v_k$ the degree of freedom and dependent on the confidence probability $\alpha$, the said Student's factor $t_{v_k,\alpha}$ making it possible to bound an error with a predetermined confidence level (1-p) required by the SBAS service, the confidence probability $\alpha$ being related to the confidence level (1-p) by the relation $$\alpha = 1 - \frac{1}{2} \cdot p,$$

and the degree of freedom $v_k$ being equal here to the number of IPP having generated a residual for the IGP concerned minus one;

G(p) is the value obtained when the Gaussian assumption is applied for the same confidence probability (1-p) or for the same probability p of the risk that one wishes to bound, that is to say the limit of the Student's factor $t_{v_k,\alpha}$ when the degree of freedom $v_k$ tends to infinity; G(p) is defined by the expression $G(p)=\text{erf}^{-1}(1-p) \times \sqrt{2}$, $\text{erf}^{-1}(\bullet)$ designating the reciprocal function of the error function and (1-p) designating the confidence level required.

As a variant of the execution of the eighth and ninth steps 324, 326, and in a manner which simplifies the computation of the standard deviation $\sigma_{MOPS}$, a sorting is performed on the residuals computed by the inverse interpolation scheme for an IGP considered as a function of the quality of the measurement of the residual $\text{Red}_i^2$ associated with a given IPPi. This makes it possible to simplify the computation of the standard deviation $\sigma_{MOPS}$ and to trim the list of the squares of residuals interpolated as inverse at the IGP considered. In this scheme, perfect control of the amount of residual applied to each IGP by virtue of the application of the inverse interpolation scheme is maintained.

After having performed a relevant sorting of the residuals applied to the IGPs concerned, the standard deviation $\sigma_{MOPS}$ is computed according to the equation:

$$\sigma_{MOPS\_simp} = \sqrt{\frac{1}{N_{ipp\_fil}} \times \sum_{i=1}^{N_{ipp\_fil}} \Delta^2_{Res_{ippi}}}$$

with:

$N_{ipp\_fil}$ being the number of IPPs having generated a residual for the IGP concerned and whose measurement quality is sufficient, $\Delta_{Res_{ipp\_i}}^2$ being the square of a residual applied to the IGP considered and generated by a sorted IPPi, that is to say having a quality measurement.

Reusing the previous matrix formulation, this gives in the particular case of a confidence level equal to $10^{-7}$:

$$\sigma_{MOPS} = \left(\frac{t_{v_k,0.99999995}}{5.33}\right) \cdot \sqrt{(K \cdot K^t)^{-1} \cdot K \cdot X^t} \quad \text{(equation \#26)}$$

The inverse interpolation scheme, implemented in the first method 202 for fitting the GIVEs, is here also used in the second method 302 for optimally computing the term $\sigma_{MOPS}$ which makes it possible to compensate for the deviations induced by the standard used in the computation of ionospheric delays at the level of the user. Applied in this second method, the inverse interpolation scheme makes it possible to guarantee correct distribution of the estimated residuals so as to give each IGP the value of residual as a function of the effective contribution of each IPP in relation to this IGP.

An SBAS satellite-based augmentation system for augmenting the performance of a global navigation satellite system GNSS, configured to execute the second method of optimal computation of FIG. 11, comprises SBAS service(s) user terminals, one or more satellites for augmenting the satellites of the GNSS system and for broadcasting information messages to the user terminals, one or more RIMS observation stations furnished with GNSS receivers, and one or more computers.

The SBAS system is configured to compute in an optimal manner variances of the residuals of a first set of IGP points of an ionospheric correction grid for a service area of an SBAS system, the ionospheric correction grid being structured as a meshed network of cells of predetermined polygonal shape, the cells of the meshed network corresponding projectively to the SBAS service area and having as vertices IGP points of the first set.

The electronic computer or computers of the SBAS system are configured to:

on the basis of predetermined information in respect of ionospheric error correction of the IGP points of the first set, and of measurements of pseudo-distances of a second set of control and observation pierce points IPP which are contained in the cells of the ionospheric grid, for each observation pierce point IPPi of the second set, a residual, designated by $Res_i$, referred to the vertical, according to the equation:

$$Res_i = \frac{STEC_i - UISD_i}{F_{pp\ standard}}$$

in which:
$STEC_i$ designates the ionospheric delay, measured by an observation station, of the real line of sight and which is dependent on the elevation of the said line of sight;
$UISD_i$ designates the vertical ionospheric delay interpolated according to the standard of the user terminal on the basis of the $GIVD_k$ of the $IGP_k$ of the mesh cell surrounding the IPPi;
$F_{pp\ standard}$ designates the standard rabattement function for mapping the ionospheric delay as a function of the elevation of the line of sight,
and then compute the square of the residual;
and thereafter for each observation pierce point IPPi of the second set,
determine values of variance increments $\Delta_{Resk}^2$ to be allocated respectively to the IGPk of the mesh cell m of the IPPi considered by an inverse interpolation scheme using a Least Squares scheme in which a vector Yi of distribution of the square of the residual $Res_i^2$ of the IPPi considered is computed according to the equation:

$$Yi = Hi^t \cdot (Hi \cdot Hi^t)^{-1} \cdot Res_i^2$$

in which
$H = [w_1\ w_2, \ldots w_{NIGP}]$ designates a row vector with $N_{IGP}$ components for carrying out the interpolation of the IPPi considered; each component $w_k$, k varying from 1 to $N_{IGP}$, corresponding to the weight of an $IGP_k$ obtained with the direct interpolation computation scheme defined by the standard for the IPPi considered;

$$*Yi = \begin{bmatrix} \Delta_{Res1}^2 \\ \Delta_{Res2}^2 \\ \ldots \\ \Delta_{ResNIGP}^2 \end{bmatrix}$$

designates a column vector with $N_{IGP}$ components of the distribution of the square of the residual $Res_i^2$ to be distributed over the $N_{IGP}$ IGPk when the mesh cell of the IPPi considered comprises $N_{IGP}$ IGP, as result of solving the equation;

$Res_i^2$ designates the square of the residual to be distributed, and then
determine a weighting coefficient pi as inverse of a weight, this weighting coefficient being representative of the quality of the measurement of the STECi rectified into VTECi by dividing by the rabattement function for mapping the IPPi considered, and expressed according to the following formula:

$$p_i = \frac{\sigma_{VTEC_i^2}}{\sigma_{VTEC\ NOMINAL}^2}$$

in which
$w_i$ designates the weight of the IPPi according to the IGP such as defined by the DO-229 standard.
$\sigma_{VTEC_i}^2$ designates the measurement noise in respect of the pseudo-distance measured by the measurement terminal for the IPPi considered, and
$\sigma_{VTEC_i}^2$ designates a nominal reference measurement noise of the measurement terminal;

thereafter, after having computed all the Yi and pi corresponding to the first set of the pierce points IPPi observed, for each IGP, compute an unexpanded-residual variance according to the equation:

$$\sigma_{MOPS} = \sqrt{\frac{1}{Ps} \times \sum_{i=1}^{Nipp} \frac{1}{p_i} \times \Delta_{Res_{ippi}}^2}$$

with:
Ps, the sum of the normalized weights $1/p_i$ of each residual that are available for the following IGP considered:

$$Ps = \sum_{i=1}^{N_{ipp}} \frac{1}{p_i}$$

$N_{ipp}$ being the number of IPPs having generated a residual for the IGP concerned,
$\Delta_{Res_{ipp\ i}}^2$ the residual interpolated as inverse at the IGP considered for the IPPi forming part of the IPPs having generated a residual for the IGP concerned.

As a variant, the SBAS satellite-based augmentation system is configured to execute one of the variants, described hereinabove, of the second method of optimal computation.

The invention claimed is:

1. A method for optimally fitting GIVE ionospheric correction error bounds of a first set of IGP points of an ionospheric correction grid for a service area of a satellite-based augmentation system SBAS, the ionospheric correction grid being structured as a meshed network of cells of predetermined polygonal shape, the cells of the meshed network corresponding projectively to the SBAS service area and having as vertices IGP points of the first set, the method for optimally fitting the error bounds comprising the steps of:
computing by at least one electronic computer, on the basis of predetermined information in respect of ionospheric error corrections of the IGP points of the first set, and of measurements of pseudo-distances of a second set of control and observation pierce points IPP which are contained in the cells of the ionospheric grid, for each observation pierce point IPPi of the second set, an innovation designated by stdUIVDerror$_i$, according to the expression:

$$\text{stdUIVDerror}_i = |VTEC_i - UIVD_i| / \sqrt{\sigma_{VTEC_i}^2 + \sigma_{UIVE_i}^2}$$

in which:
- $VTEC_i$ designates the vertical ionospheric delay measured at the IPPi,
- $UIVD_i$ designates the vertical ionospheric delay interpolated on the basis of the GIVDj of the IGPj of the mesh cell of rank m surrounding the IPPi concerned;
- $\sigma VTEC_i$ designates the standard deviation of the measurement noise at the IPPi,
- $\sigma_{UIVE_i}$ designates the standard deviation arising from the GIVEs of the IGPj of the mesh cell of rank m having participated in the interpolation of the UIVDi of the IPPi concerned; and then when the innovation of the IPPi scanned in the current mesh cell of rank m is strictly greater than a theoretical threshold MaxThd corresponding to predetermined confidence and integrity level required by the SBAS service, computing a variance increment $\Delta_{UIVE_i}^2$ that would need to be added to the $\sigma_{UIVE_i}^2$ on the IPPi considered in order for it to cover the integrity level required according to the equation:

$$\Delta_{UIVE_i}^2 = (\beta + \sigma_{UIVE_i}^2) \times (K_{fact}^2 - 1)$$

in which:
- $\sigma_{UIVE_i}$ designates the standard deviation arising from the GIVEs of the IGPj of the mesh cell of rank m having participated in the interpolation of the UIVDi of the IPPi concerned;
- $\beta$ and $K_{fact}^2$ designate respectively a first term and a second term, the first term $\beta$ being determined according to the equation:

$$\beta = \sigma_{VTEC_i}^2$$

where $VTEC_i$ designates the vertical ionospheric delay measured at the IPPi considered, and
the second term $K_{fact}^2$ being determined according to the equation:

$$K_{fact}^2 = \frac{\text{stdUIVDerror}_i^2}{(\text{SafMarg} \times \text{MaxThd})^2}$$

SafMarg designating the integrity margin as a percentage of the tolerated maximum threshold that one wishes to generate, greater than zero and strictly less than 1, and configured as a function of an integrity guarantee margin as a predetermined relative value, denoted X and expressed as a percentage, according to the expression: SafMarg=(1−X);
the method of optimal fitting further comprising the steps of, when the innovation of the IPPi scanned in the current mesh cell of rank m is strictly greater than a theoretical threshold MaxThd:
determining (220) values of variance increments $\Delta_{GIVE_k}^2$ to be allocated respectively to the IGPk of the mesh cell of the IPPi considered by an inverse interpolation scheme using a Least Squares scheme so as to distribute the variance increment $\Delta_{UIVE_i}^2$ of the IPPi according to the relation:

$$\Delta_{UIVE_i}^2 = \sum_{k=1}^{N_{IGP}} w_k \cdot \Delta_{GIVE_k}^2$$

in which
- $N_{IGP}$ is the number of IGPs of the mesh cell of predetermined shape that are used in the computation of the UIVDi and UIVEi of the IPPi considered;
- k designates a numbering index in the mesh cell containing the IPPi of the IGPs of the said mesh cell,
- $w_k$ designate the respective weights of the IGPk, k varying from 1 to $N_{IGP}$, computed by applying the GNSS standard according to a function of the GNSS standard which depends on the distance between the IPPi and the IGPk, the sum of the weights $w_k$ being equal to one; and then
for each IGPk of the mesh cell m to which the IPPi considered belongs, updating the variance $\sigma_{GIVE_k}$ of the said IGPk by replacing the current value $\sigma_{GIVE_k}$ of the GIVEk with a new value equal to $$\sqrt{\sigma_{GIVE_k}^2 + \Delta_{GIVE_k}^2}.$$

2. The method for optimally fitting GIVE ionospheric correction error bounds according to claim 1, wherein the determination step of determining the values of variance increments $\Delta_{GIVE_k}^2$ to be allocated respectively to the IGPk of the mesh cell of the IPPi considered is implemented by a Conventional Least Squares scheme in which a vector Yi of distribution of the $\Delta_{UIVE_i}^2$ of the IPPi considered over the associated IGPk is computed according to the equation:

$$Yi = Hi^t \cdot (Hi \cdot Hi^t)^{-1} \cdot \Delta_{UIVE_i}^2$$

in which
- $Hi = [w_1 \; w_2 \; \ldots \; W_{NIGP}]$ designates a row vector with $N_{IGP}$ components for carrying out the interpolation of the IPPi considered, each component $w_k$, k varying from 1 to $N_{IGP}$, corresponding to the weight of an $IGP_k$ obtained with the direct interpolation computation scheme defined by the standard for the IPPi considered;

$$Yi = \begin{bmatrix} \Delta_{GIVE_1}^2 \\ \Delta_{GIVE_2}^2 \\ \ldots \\ \Delta_{GIVE_{NIGP}}^2 \end{bmatrix}$$

designates a column vector with $N_{IGP}$ components of the distribution of the variance increment $\Delta_{UIVE_i}^2$ to be distributed over the $NI_{GP}$ IGPk when the mesh cell of the IPPi considered comprises $N_{IGP}$ IGPs, as result of solving the equation;
$\Delta_{UIVE_i}^2$ designates the variance increment to be distributed.

3. The method for optimally fitting GIVE ionospheric correction error bounds according to claim 1, wherein the determination step of determining the values of variance increments $\Delta_{GIVE_k}^2$ to be allocated respectively to the IGPk of the mesh cell of the IPPi considered is implemented by a least squares scheme fitted through a confidence level 1-p in which a vector Yi of distribution of the $\Delta_{UIVE_i}^2$ of the IPPi considered over the associated IGPk is computed according to the equation:

$$Yi = T_i^{CALSQ} \cdot Hi^t \cdot (Hi \cdot Hi^t)^{-1} \cdot \Delta_{UIVE_i}^2$$

in which $$Yi = \begin{bmatrix} \Delta^2_{GIVE_1} \\ \Delta^2_{GIVE_2} \\ ... \\ \Delta^2_{GIVE_{NIGP}} \end{bmatrix}$$

designates a column vector with $N_{IGP}$ components of the distribution of the variance increment $\Delta_{UIVE_i}^2$ to be distributed over the $NI_{GP}$ IGPk when the mesh cell of the IPPi considered comprises $N_{IGP}$ IGP, as result of solving the equation;

Hi=[$w_1$ $w_2$ ... $w_{NIGP}$] designates a row vector with $N_{IGP}$ components for carrying out the interpolation of the IPPi considered, each component $w_k$, k varying from 1 to $N_{IGP}$, corresponding to the weight of an $IGP_k$ obtained with the direct interpolation computation scheme defined by the standard for the IPPi considered; and $T_i^{CALSQ}$ is a square inflation matrix of rank NIGP, defined by:

$$T_i^{CALSQ} = \frac{1}{G(p)^2} \begin{bmatrix} t^2_{v_1,\alpha} & 0 & ... & 0 \\ 0 & t^2_{v_2,\alpha} & ... & 0 \\ ... & ... & ... & ... \\ 0 & 0 & ... & t^2_{v_4,\alpha} \end{bmatrix}$$

with $t_{v_k,\alpha}$ designating the associated Student's factor the 1GPk of rank k dependent on $v_k$ the degree of freedom and dependent on the confidence probability $\alpha$, the said Student's factor $t_{v_k,\alpha}$ making it possible to bound an error with a predetermined confidence level (1-p) required by the SBAS service, the confidence probability $\alpha$ being related to the confidence level by the relation $$\alpha = 1 - \frac{1}{2} \cdot p,$$

and the degree or freedom $v_k$ being equal here to the number of IPP having generated a residual for the IGPk concerned minus one; and G(p) designating the value obtained when the Gaussian assumption is applied for the same confidence probability (1-p) as that used for the computation of $\alpha$, that is to say the limit of the Student's factor $t_{v_k,\alpha}$ when the degree of freedom $v_k$ tends to infinity; and $\Delta_{UIVE_i}^2$ designates the variance increment to be distributed.

4. The method for optimally fitting GIVE ionospheric correction error bounds according to claim 1, wherein the determination step f determining the values of variance increments $\Delta_{GIVE_k}^2$ to be allocated respectively to the IGPk of the mesh cell of the IPPi considered is implemented by a least squares scheme weighted by a confidence level niv_conf, in which a vector Yi of distribution of the $\Delta_{UIVE_i}^2$ of the IPPi considered over the associated IGPk is computed according to the equation:

$Yi = Pi \cdot Hi^t \cdot (Hi \cdot Pi \cdot Hi^t)^{-1} \cdot \Delta_{UIVE_i}^2$ in which $$Yi = \begin{bmatrix} \Delta^2_{GIVE_1} \\ \Delta^2_{GIVE_2} \\ ... \\ \Delta^2_{GIVE_{NIGP}} \end{bmatrix}$$

designates a column vector with $N_{IGP}$ components of the distribution of the variance increment $\Delta_{UIVE_i}^2$ to be distributed over the Map IGPk when the mesh cell of the IPPi considered comprises NIGP IGP, as result of solving the equation;

Hi=[$w_1$ $w_2$ ... $w_{NIGP}$] designates a row vector with $N_{IGP}$ components for carrying out the interpolation of the IPPi considered, each component $w_k$, k varying from 1 to $N_{IGP}$, corresponding to the weight of an $IGP_k$ obtained with the direct interpolation computation scheme defined by the standard for the IPPi considered; and Pi is a diagonal square weighting matrix of rank $N_{IGP}$, defined by:

$$Pi = \begin{bmatrix} q_1 & 0 & ... & 0 \\ 0 & q_2 & ... & 0 \\ ... & ... & ... & ... \\ 0 & 0 & ... & q_{NIGP} \end{bmatrix}$$

with $$q_k = \left(\frac{t_{v_k,\alpha}}{G(p)}\right)^2$$

associated with the IGPk, k varying from 1 to $N_{IGP}$, $t_{v_k,\alpha}$ designating the associated Student's factor the 1GPk of rank k dependent on $v_k$ the degree of freedom and dependent on the confidence probability $\alpha$, the said Student's factor $t_{v_k,\alpha}$ making it possible to bound an error with a predetermined confidence level (1-p) required by the SBAS service, the confidence probability $\alpha$ being related to the confidence level by the relation $$\alpha = 1 - \frac{1}{2} \cdot p,$$

and the degree of freedom $v_k$ being equal here to the number of IPP having generated a residual for the IGPk concerned minus one; and G(p) designating the value obtained when the Gaussian assumption is applied for the same confidence probability (1-p) as that used for the computation of $\alpha$, that is to say the limit of the Student's factor $t_{v_k,\alpha}$ when the degree of freedom $v_k$ tends to infinity; and $\Delta_{UIVE_i}^2$ designates the variance increment to be distributed.

5. The method for optimally fitting GIVE ionospheric correction error bounds of the IGPs according to claim 1, wherein the determination step of determining the values of variance increments $\Delta_{GIVE_k}^2$ to be allocated respectively to the IGPk of the mesh cell of the IPPi considered is implemented by a least squares scheme weighted by a confidence level 1-p in which a vector Yi of distribution of the $\Delta_{UIVE_i}^2$ of the IPPi considered over the associated IGPk is computed according to the equation:

$$Yi = Hi^t \cdot (Hi \cdot Hi^t)^{-1} \cdot \left[\Delta_{UIVE_i}^2 \cdot \left(\frac{t_{Nb_{IPP\_MEAN},\alpha}}{G(p)}\right)^2\right]$$

in which $$Yi = \begin{bmatrix} \Delta_{GIVE_1}^2 \\ \Delta_{GIVE_2}^2 \\ \ldots \\ \Delta_{GIVE_{NIGP}}^2 \end{bmatrix}$$

designates a column vector with $N_{IGP}$ components of the distribution of the variance increment $\Delta_{UIVE_i}^2$ to be distributed over the NIGP IGPk when the mesh cell of the IPPi considered comprises NIGP IGP, as result of solving the equation;

Hi=$[w_1\ w_2\ \ldots\ w_{NIGP}]$ designates a row vector with $N_{IGP}$ components for carrying out the interpolation of the IPPi considered, each component $w_k$, k varying from 1 to $N_{IGP}$, corresponding to the weight of an $IGP_k$ obtained with the direct interpolation computation scheme defined by the standard for the IPPi considered; and $t_{Nb_{IPP\_MEAN},\alpha}$ designating a Student's factor dependent on the confidence probability $\alpha$, the said Student's factor $t_{Nb_{IPP\_MEAN},\alpha}$ making it possible to bound an error with a predetermined confidence level (1-p) required by the SBAS service, the confidence probability $\alpha$ being related to the confidence level by the relation $$\alpha = 1 - \frac{1}{2} \cdot p,$$

and the degree of freedom $Nb_{IPP\_MEAN}$ being a number computed on the basis of the weighted sum of the number of IPP in the neighbourhood of the IGPk having served in obtaining the UIVDi and UIVEi of the IPPi tested, according to the formula:

$$Nb_{IPP\_MEAN} = \frac{\sum_{k=1}^{N_{IGP}} w_k \cdot (Nb_{IPPk} - 1)}{\sum_{k=1}^{N_{IGP}} w_k}$$

with:

$w_k$, the weight of the IGPk obtained by applying the interpolation scheme defined by the RTCA DO-229D standard to the IPPi concerned to obtain its UIVDi and UIVEi;

$Nb_{IPP\_k}$ corresponds to the number of IPP situated around the IGPk in the neighbourhood consisting of the union of all the cells containing this IGPk; and G(p) designating the value obtained when the Gaussian assumption is applied for the same confidence probability (1-p) as that used for the computation of $\alpha$, that is to say the limit of the Student's factor $t_{v_k,\alpha}$ when the degree of freedom $v_k$ tends to infinity; and $\Delta_{UIVE_i}^2$ designates the variance increment to be distributed.

6. The method for optimally fitting GIVE ionospheric correction error bounds according to claim 1, wherein the shape of each mesh cell is a triangular shape and the number $N_{IGP}$ of vertex IGPs of each mesh cell is equal to 3, or the shape of each mesh cell is the shape of a quadrilateral, preferably comprised from among the shapes of a rectangle, of a square and of a lozenge, and the number $N_{IGP}$ of vertex IGPs of each mesh cell is equal to 4.

7. An SBAS satellite-based augmentation system for augmenting the performance of a global navigation satellite system GNSS, the SBAS system comprising SBAS service(s) user terminals, one or more satellites for augmenting the satellites of the GNSS system and for broadcasting information messages to the user terminals, one or more RIMS observation stations furnished with GNSS receivers, and one or more computers, the SBAS system configured to fit in an optimal manner ionospheric correction error bounds, called final GIVEs, of a first set of IGP points of an ionospheric correction grid for a service area of the SBAS system, the ionospheric correction grid being structured as a meshed network of cells of predetermined polygonal shape, the cells of the meshed network corresponding projectively to the SBAS service area and having as vertices IGP points of the first set, and the SBAS system wherein the electronic computer or computers are configured to:

on the basis of predetermined information in respect of ionospheric error correction of the IGP points of the first set, and of measurements of pseudo-distances of a second set of control and observation pierce points IPP which are contained in the cells of the ionospheric grid, for each observation pierce point IPPi of the second set, an innovation designated by stdUIVDerror$_i$, according to the expression:

$$stdUIVDerror_i = \frac{|VTEC_i - UIVD_i|}{\sqrt{\sigma_{VTEC_i}^2 + \sigma_{UIVE_i}^2}}$$

in which:

VTEC$_i$ designates the vertical ionospheric delay measured at the IPP i, *UIVD$_i$ designates the vertical ionospheric delay interpolated on the basis of the GIVDj of the IGPj of the mesh cell of rank m surrounding the IPPi concerned;

$\sigma_{VTEC_i}$ designates the standard deviation of the measurement noise at the IPPi, $\sigma_{UIVE_i}$ designates the standard deviation arising from the GIVEs of the IGPj of the mesh cell of rank m having participated in the interpolation of the UIVDi of the IPPi concerned; and then when the innovation of the IPPi scanned in the current mesh cell of rank m is strictly greater than a theoretical threshold MaxThd corresponding to a predetermined confidence or integrity level (1-p) required by the SBAS service, compute a variance increment $\Delta_{UIVE_i}^2$ that would need to be added to the $\sigma_{UIVE_i}^2$ on the IPPi considered in order for it to cover the integrity level required according to the equation:

$$\Delta_{UIVE_i}^2 = (\beta + \sigma_{UIVE_i}^2) \times (K_{fact}^2 - 1)$$

in which:
$\sigma_{UIVE_i}$ designates the standard deviation arising from the GIVEs of the IGPj of the mesh cell of rank m having participated in the interpolation of the UIVDi of the IPPi concerned;
$\beta$ and $K_{fact}^2$ designate respectively a first term and a second term,
the first term $\beta$ being determined according to the equation:

$$\beta = \sigma_{VTEC_i}^2$$

where $VTEC_i$ designates the vertical ionospheric delay measured at the IPPi considered, and
the second term $K_{fact}^2$ being determined according to the equation:

$$K_{fact}^2 = \frac{stdUIVDerror_i^2}{(SafMarg \times MaxThd)^2}$$

SafMarg designating the integrity margin as a percentage of the tolerated maximum threshold that one wishes to generate, greater than zero and strictly less than 1, and configured as a function of an integrity guarantee margin as a predetermined relative value, denoted X and expressed as a percentage, according to the expression: SafMarg=(1−X); and then
when the innovation of the IPPi scanned in the current mesh cell of rank m is strictly greater than a theoretical threshold MaxThd:
determine values of variance increments $\Delta_{GIVE_k}^2$ to be allocated respectively to the IGPk of the mesh cell of the IPPi considered by an inverse interpolation scheme using a Least Squares scheme so as to distribute the variance increment $\Delta_{UIVE_i}^2$ of the IPPi according to the relation:

$$\Delta_{UIVE_i}^2 = \sum_{k=1}^{N_{IGP}} w_k \cdot \Delta_{GIVE_k}^2$$

in which
$N_{IGP}$ the number of IGPs of the mesh cell of predetermined shape that are used in the computation of the UIVDi and UIVEi of the IPPi considered;
k designates a numbering index in the mesh cell containing the IPPi of the IGPs of the said mesh cell,
$w_k$ designate the respective weights of the IGPk, k varying from 1 to $N_{IGP}$, computed by applying the GNSS standard according to a function of the GNSS standard which depends on the distance between the IPPi and the IGPk, the sum of the weights $w_k$ being equal to one; and then
for each IGPk of the mesh cell m to which the IPPi considered belongs, update the variance $GIVE_k$ of the said IGPk by replacing the current value $\sigma_{GIVE_k}$ of the GIVEk with a new value equal to $\sqrt{\sigma_{GIVE_k}^2 + \Delta_{GIVE_k}^2}$.

8. A method for optimally computing the variances of the residuals of a first set of IGP points of an ionospheric correction grid for a service area of an SBAS system, the ionospheric correction grid being structured as a meshed network of cells of predetermined polygonal shape, the cells of the meshed network corresponding projectively to the SBAS service area and having as vertices IGP points of the first set,
the method for optimally computing the variances of the residuals of the IGPs comprising the steps of:
computing by at least one electronic computer, on the basis of predetermined information in respect of ionospheric error correction of the IGP points of the first set, and of measurements of pseudo-distances of a second set of control and observation pierce points IPP which are contained in the cells of the ionospheric grid, for each observation pierce point IPPi of the second set, a residual, designated by $Res_i$, referred to the vertical, according to the equation:

$$Res_i = \frac{STEC_i - UISD_i}{F_{pp\ standard}}$$

in which:
STECi designates the ionospheric delay, measured by an observation station, of the real line of sight and which is dependent on the elevation of the said line of sight;
UISDi designates the vertical ionospheric delay interpolated according to the standard of the user terminal on the basis of the GIVDk of the IGPk of the mesh cell surrounding the IPPi;
$F_{pp\ standard}$ designates the standard rabattement function for mapping the ionospheric delay as a function of the elevation of the line of sight,
and then the square $Res_i^2$; of the residual $Res_i$;
the method for optimally computing the variances of the residuals of the IGPs further comprising the steps of,
for each observation pierce point IPPi of the second set, determining values of variance increments $\Delta_{Resk}^2$ to be allocated respectively to the IGPk of the mesh cell m of the IPPi considered by an inverse interpolation scheme using a Least Squares scheme in which a vector Yi of distribution of the square $Res_i^2$ of the residual $Res_i$ of the IPPi considered is computed according to the equation:

$$Yi = Hi' \cdot (Hi \cdot Hi')^{-1} \cdot Res_i^2$$

in which
$H = [w_1\ w_2\ \ldots\ w_{NIGP}]$ designates a row vector with NIGP components for carrying out the interpolation of the IPPi considered, each component $w_k$, k varying from 1 to $N_{IGP}$, corresponding to the weight of an $IGP_k$ obtained with the direct interpolation computation scheme defined by the standard for the IPPi considered;

$$*Yi = \begin{bmatrix} \Delta_{Res1}^2 \\ \Delta_{Res2}^2 \\ \ldots \\ \Delta_{ResNIGP}^2 \end{bmatrix}$$

designates a column vector with NIGP components of the distribution of the square $Res_i^2$ of the residual $Res_i$ to be distributed over the NIGP IGPk when the mesh cell of the IPPi considered comprises $N_{IGP}$ IGP, as result of solving the equation;
$Res_i^2$ designates the square of the residual $Res_i$ to be distributed, and then determining a weighting coefficient pi as inverse of a weight, this weighting coefficient being representative of the quality of the measurement of the STECi rectified into VTECi by dividing by the rabattement function for mapping the IPPi considered, and expressed according to the following formula:

$$p_i = \frac{\sigma^2_{VTEC_i}}{\sigma^2_{VTEC\ NOMINAL}}$$

in which
$\sigma_{VTEC_i}^2$ designates the measurement noise in respect of the pseudo-distance measured by the measurement terminal for the IPPi considered, and
$\sigma_{VTEC_{NOMINAL}}^2$ designates a nominal reference measurement noise of the measurement terminal;
thereafter, after having computed all the Yi and pi corresponding to the first set of the pierce points IPPi observed,
for each IGP, computing an unexpanded-residual variance according to the equation:

$$\sigma_{MOPS} = \sqrt{\frac{1}{Ps} \times \sum_{i=1}^{Nipp} \frac{1}{p_i} \times \Delta^2_{Res_{ippi}}}$$

with:
Ps, the sum of the normalized weights $1/p_i$ of each residual that are available for the following IGP considered:

$$Ps = \sum_{i=1}^{N_{ipp}} \frac{1}{p_i}$$

$N_{ipp}$ being the number of IPPs having generated a residual for the IGP concerned,
$\Delta_{Res_{ippi}}^2$ the residual interpolated as inverse at the IGP considered for the IPPi forming part of the IPPs having generated a residual for the IGP concerned.

9. The method for optimally computing the variances of the residuals of a first set of IGP points of an ionospheric correction grid for a service area of an SBAS system according to claim 8, wherein
the weighting coefficient $p_i$ is modulated by the inverse of the weight $w_i$ of the IPPi according to the IGP such as defined by the MOPS DO-229 standard and may be written according to the expression:

$$p_i = \frac{1}{w_i} \times \frac{\sigma^2_{VTEC_i}}{\sigma^2_{VTEC\ NOMINAL}},$$

and
the standard deviation $\sigma_{MOPS}$ of the IGP considered is computed according to the expression $\sigma_{MOPS} = \sqrt{(K \cdot P \cdot K^t)^{-1} \cdot K \cdot P \cdot X^t}$ in which:
K designates the unit row vector of dimension Nipp:
K=[1 1 . . . 1], P designates the diagonal matrix of weights and $$P = \begin{bmatrix} \frac{1}{p_1} & \cdots & 0 \\ \vdots & \ddots & \vdots \\ 0 & \cdots & \frac{1}{p_{Nipp}} \end{bmatrix},$$

X designates the column vector of residuals:

$$X = \begin{bmatrix} \Delta^2_{Res_1} \\ \vdots \\ \Delta^2_{Res_{Nipp}} \end{bmatrix}.$$

10. The method for optimally computing the variances of the residuals of a first set of IGP points of an ionospheric correction grid for a service area of an SBAS system according to claim 8, wherein
the weighting coefficient $p_i$ is modulated by the inverse of the weight $w_{i\ centre\ norm}$ of the IPPi according to the IGP the expression:

$$p_i = \frac{1}{w_i\ \text{centre norm}} \times \frac{\sigma^2_{VTEC_i}}{\sigma^2_{VTEC\ NOMINAL}}$$

in which the weight $w_{i\ centre\ norm}$ is computed according to the equation:
if $w_i=0$, then the IPP is not used for the computation of the $\sigma_{MOPS}$ of the IGP considered
if $$0 < w_i < \frac{1}{N_{IGP}}, \text{ then } w_{i\ center\ norm} = w_i$$

otherwise, $$w_{i\ center\ norm} = 1 - \frac{w_{i\ center\ ini}}{\sum_{i=1}^{N_{IGP}} w_{i\ center\ ini}},$$

$N_{IGP}$ corresponding to the number of IGP having served in the interpolation of the ionospheric delay at the IPPi and the term $w_{i\ center\ ini}$ being written $$w_{i\ center\ ini} = \left| w_i - \frac{1}{N_{IGP}} \right|,$$

the weight $w_i$ being defined by the MOPS DO-229 standard, and
the standard deviation $\sigma_{MOPS}$ of the IGP considered is computed according to the expression $\sigma_{MOPS} = \sqrt{(K \cdot P \cdot K^t)^{-1} \cdot K \cdot P \cdot X^t}$ in which:
K designates the unit row vector of dimension Nipp:
K=[1 1 . . . 1], P designates the diagonal matrix of weights $$P = \begin{bmatrix} \frac{1}{p_1} & \cdots & 0 \\ \vdots & \ddots & \vdots \\ 0 & \cdots & \frac{1}{p_{Nipp}} \end{bmatrix},$$

and

X designates the column vector of residuals:

$$X = \begin{bmatrix} \Delta^2_{Res_1} \\ \vdots \\ \Delta^2_{Res_{Nipp}} \end{bmatrix}.$$

11. The method for optimally computing the variances of the residuals of a first set of IGP points of an ionospheric correction grid for a service area of an SBAS system according to claim 8, comprising an additional step of:

for each 1GPk of the second set, computing an expanded-residual variance $\sigma_{MOPS}^d$ on the basis of the unexpanded-residual variance $\sigma_{MOPS}$ according to the equation:

$$\sigma_{MOPS}^d = \left(\frac{t_{v_k,\alpha}}{G(p)}\right) \cdot \sigma_{MOPS}$$

with $$d_k = \left(\frac{t_{v_k,\alpha}}{G(p)}\right)$$

the expansion coefficient associated with the IGPk, k varying from 1 to $N_{IGP}$, $t_{v_k}^{\cdot \alpha}$ designating the associated Student's factor the 1GPk of rank k dependent on $v_k$ the degree of freedom and dependent on the confidence probability α, the said Student's factor $t_{v_k,\alpha}$ making it possible to bound an error with a predetermined confidence level (1-p) required by the SBAS service, the confidence probability α being related to the confidence level by the relation $$\alpha = 1 - \frac{1}{2} \cdot p,$$

and the degree of freedom $v_k$ being equal here to the number of IPP having generated a residual for the IGPk concerned minus one; and G(p) designating the value obtained when the Gaussian assumption is applied for the same confidence probability α, that is to say the limit of the Student's factor $t_{v_k,\alpha}$ when the degree of freedom $v_k$ tends to infinity.

12. A simplified method for optimally computing the variances of the residuals of a first set of IGP points of an ionospheric correction grid for a service area of an SBAS system, the ionospheric correction grid being structured as a meshed network of cells of predetermined polygonal shape, the cells of the meshed network corresponding projectively to the SBAS service area and having as vertices IGP points of the first set, the method for optimally computing the variances of the residuals of the IGPs comprising the steps of:

computing with at least one electronic computer, on the basis of predetermined information in respect of ionospheric error correction of the IGP points of the first set, and of measurements of pseudo-distances of a second set of control and observation pierce points IPP which are contained in the cells of the ionospheric grid, for each observation pierce point IPPi of the second set, a residual, designated by $Res_i$, referred to the vertical, according to the equation:

$$Res_i = \frac{STEC_i - UISD_i}{F_{pp\ standard}}$$

in which:

STECi designates the ionospheric delay, measured by an observation station, of the real line of sight and which is dependent on the elevation of the said line of sight;

UISDi designates the vertical ionospheric delay interpolated according to the standard of the user terminal on the basis of the GIVDk of the IGPk of the mesh cell surrounding the IPPi;

$F_{pp\ standard}$ designates the standard rabattement function for mapping the ionospheric delay as a function of the elevation of the line of sight, and then the square $Res_i^2$ of the residual $Res_i$;

the method for optimally computing the variances of the residuals of the IGPs further comprising the steps of, for each observation pierce point IPPi of the second set, determining values of variance increments $\Delta_{Resk}^2$ to be allocated respectively to the IGPk of the mesh cell m of the IPPi considered by an inverse interpolation scheme using a Least Squares scheme in which a vector Yi of distribution of the square $Res_i^2$ of the residual $Res_i$ of the IPPi considered is computed according to the equation:

$$Yi = Hi' \cdot (Hi \cdot Hi')^{-1} \cdot Res_i^2$$

in which $H = [w_1\ w_2\ \ldots\ w_{NIGP}]$ designates a row vector with $N_{IGP}$ components for carrying out the interpolation of the IPPi considered, each component wk, k varying from 1 to $N_{IGP}$, corresponding to the weight of an IGPk obtained with the direct interpolation computation scheme defined by the standard for the IPPi considered;

$$*Yi = \begin{bmatrix} \Delta^2_{Res1} \\ \Delta^2_{Res2} \\ \ldots \\ \Delta^2_{REesNIGP} \end{bmatrix}$$

designates a column vector with $N_{IGP}$ components of the distribution of the square $Res_i^2$ of the residual $Res_i$ to be distributed over the $N_{IGP}$ IGPk when the mesh cell of the IPPi considered comprises $N_{IGP}$ IGP, as result of solving the equation;

$Res_i^2$ designates the square of the residual $Res_i$ to be distributed, and then determining a weighting coefficient pi as inverse of a weight, this weighting coefficient being representative of the quality of the measurement of the STECi rectified into VTECi by dividing by the rabattement function for mapping the IPPi considered, and expressed according to the following formula:

$$p_i = \frac{1}{w_i} \times \frac{\sigma^2_{VTEC_i}}{\sigma^2_{VTEC\ NOMINAL}}$$

in which
$\sigma_{VTEC_i}^2$ designates the measurement noise in respect of the pseudo-distance measured by the measurement terminal for the IPPi considered,
$w_i$ designates the weight of the IPPi according to the IGP such as defined by the DO-229 standard; and
$\sigma_{VTEC_iNOMINAL}^2$ designates a nominal reference measurement noise of the measurement terminal;
thereafter, after having computed all the Yi and pi corresponding to the first set of the pierce points IPPi observed,
for each IGP,
sorting the residuals computed by the inverse interpolation scheme by removing the residuals computed on the basis of those IPPi whose measurement qualities are insufficient with respect to a predetermined quality threshold, and retaining the $N_{ipp\_fil}$ computed residuals, and then
computing an unexpanded simplified residual variance according to the equation:

$$\sigma_{MOPS\_simp} = \sqrt{\frac{1}{N_{ipp\_fil}} \times \sum_{i=1}^{N_{ipp\_fil}} \Delta^2_{Res_{ippi}}}$$

with:
$N_{ipp\_fil}$ the number of IPPs having generated a residual for the 1GP concerned and whose measurement quality is sufficient;
$\Delta_{Res_{ippi}}^2$ is the residual interpolated as inverse at the IGP considered for the IPPi forming part of the sorted IPPs having generated a residual for the IGP concerned.

13. The simplified method for optimally computing the variances of the residuals of a first set of IGP points of an ionospheric correction grid for a service area of an SBAS system according to claim 12, wherein
for each 1GPk of the second set, compute an expanded simple residual variance $\sigma_{MOPS\_simp}^d$ on the basis of the unexpanded simple residual variance $\sigma_{MOPS\_simp}$ according to the equation:

$$\sigma_{MOPS\_simp}^d = \left(\frac{t_{v_k,\alpha}}{G(p)}\right) \cdot \sigma_{MOPS\_simp}$$

with $$d_k = \left(\frac{t_{v_k,\alpha}}{G(p)}\right)$$

associated with the IGPk, k varying from 1 to $N_{IGP}$,
$t_{v_k,\alpha}$ designating the associated Student's factor the 1GPk of rank k dependent on $v_k$ the degree of freedom and dependent on the confidence probability α, the said Student's factor $t_{v_k,\alpha}$ making it possible to bound an error with a predetermined confidence level (1-p) required by the SBAS service, the confidence probability α being related to the confidence level by the relation $$\alpha = 1 - \frac{1}{2} \cdot p,$$

and the degree of freedom $v_k$ being equal here to the number of IPP having generated a residual for the IGPk concerned minus one; and
G(p) designating the value obtained when the Gaussian assumption is applied for the same confidence probability α, that is to say the limit of the Student's factor $t_{v_k,\alpha}$ when the degree of freedom $v_k$ tends to infinity.

14. The method for optimally computing the variances of the residuals of a first set of IGP points of an ionospheric correction grid for a service area of an SBAS system according to claim 8, wherein
the shape of each mesh cell is a triangular shape and the number $N_{IGP}$ of vertex IGPs of each mesh cell is equal to 3, or
the shape of each mesh cell is the shape of a quadrilateral, preferably comprised from among the shapes of a rectangle, of a square and of a lozenge, and the number $N_{IGP}$ of vertex IGPs of each mesh cell is equal to 4.

15. An SBAS satellite-based augmentation system for augmenting the performance of a global navigation satellite system GNSS,
the SBAS system comprising SBAS service(s) user terminals, one or more satellites for augmenting the satellites of the GNSS system and for broadcasting information messages to the user terminals, one or more RIMS observation stations furnished with GNSS receivers, and one or more computers,
the SBAS system being configured to compute in an optimal manner variances of the residuals of a first set of IGP points of an ionospheric correction grid for a service area of an SBAS system, the ionospheric correction grid being structured as a meshed network of cells of predetermined polygonal shape, the cells of the meshed network corresponding projectively to the SBAS service area and having as vertices IGP points of the first set,
the SBAS system wherein the electronic computer or computers are configured to:
on the basis of predetermined information in respect of ionospheric error correction of the IGP points of the first set, and of measurements of pseudo-distances of a second set of control and observation pierce points IPP which are contained in the cells of the ionospheric grid, for each observation pierce point IPPi of the second set, a residual, designated by $Res_i$, referred to the vertical, according to the equation:

$$Res_i = \frac{STEC_i - UISD_i}{F_{pp\ standard}}$$

in which:
- STECi designates the ionospheric delay, measured by an observation station, of the real line of sight and which is dependent on the elevation of the said line of sight;
- UISDi designates the vertical ionospheric delay interpolated according to the standard of the user terminal on the basis of the GIVDk of the IGPk of the mesh cell surrounding the IPPi;

$F_{pp\ standard}$ designates the standard rabattement function for mapping the ionospheric delay as a function of the elevation of the line of sight, and then compute the square $Res_i^2$ of the residual $Res_i$;

and thereafter for each observation pierce point IPPi of the second set, determine values of variance increments $\Delta_{Resk}^2$ to be allocated respectively to the IGPk of the mesh cell m of the IPPi considered by an inverse interpolation scheme using a Least Squares scheme in which a vector Yi of distribution of the square $Res_i^2$ of the residual $Res_i$ of the IPPi considered is computed according to the equation:

$$Yi = Hi^t \cdot (Hi \cdot Hi^t)^{-1} \cdot Res_1^2$$

in which $H = [w_1\ w_2\ \ldots\ w_{NIGP}]$ designates a row vector with $N_{IGP}$ components for carrying out the interpolation of the IPPi considered, each component $w_k$, k varying from 1 to $N_{IGP}$, corresponding to the weight of an $IGP_k$ obtained with the direct interpolation computation scheme defined by the standard for the IPPi considered;

$$*Yi = \begin{bmatrix} \Delta_{Res1}^2 \\ \Delta_{Res2}^2 \\ \ldots \\ \Delta_{REesNIGP}^2 \end{bmatrix}$$

designates a column vector with NIGP components of the distribution of the square $Res_i^2$ of the residual $Res_i$ to be distributed over the NIGP IGPk when the mesh cell of the IPPi considered comprises NIGP IGP, as result of solving the equation;

*$Res_i^2$ designates the square of the residual $Res_i$ to be distributed, and then determine a weighting coefficient pi as inverse of a weight, this weighting coefficient being representative of the quality of the measurement of the STECi rectified into VTECi by dividing by the rabattement function for mapping the IPPi considered, and expressed according to the following formula:

$$p_i = \frac{\sigma_{VTEC_i}^2}{\sigma_{VTEC\ NOMINAL}^2}$$

in which
- $\sigma_{VTEC_i}^2$ designates the measurement noise in respect of the pseudo-distance measured by the measurement terminal for the IPPi considered, and
- $\sigma_{VTEC_iNOMINAL}^2$ designates a nominal reference measurement noise of the measurement terminal;

thereafter, after having computed all the Yi and pi corresponding to the first set of the pierce points IPPi observed, for each IGP, compute an unexpanded-residual variance according to the equation:

$$\sigma_{MOPS} = \sqrt{\frac{1}{Ps} \times \sum_{i=1}^{Nipp} \frac{1}{p_i} \times \Delta_{Res_{ippi}}^2}$$

with:

Ps, the sum of the normalized weights $1/p_i$ of each residual that are available for the following IGP considered:

$$Ps = \sum_{i=1}^{N_{ipp}} \frac{1}{p_i}$$

$N_{ipp}$ being the number of IPPs having generated a residual for the IGP concerned, $\Delta_{Res_{ippi}}^2$ the residual interpolated as inverse at the IGP considered for the IPPi forming part of the IPPs having generated a residual for the IGP concerned.

* * * * *

UNITED STATES PATENT AND TRADEMARK OFFICE
CERTIFICATE OF CORRECTION

PATENT NO. : 10,859,707 B2
APPLICATION NO. : 15/833949
DATED : December 8, 2020
INVENTOR(S) : Franck Haddad et al.

It is certified that error appears in the above-identified patent and that said Letters Patent is hereby corrected as shown below:

On the Title Page

In the Abstract, (57), Column 2, Line 12, "a residual $Res^2$" should be -- a residual $Res_i^2$ --.

In the Claims

In Claim 2, Column 46, Line 53, "to be distributed over the $NI_{GP}$ IGPk" should be -- to be distributed over the $N_{IGP}$ IGPk --.

In Claim 3, Column 47, Line 13, "to be distributed over the $NI_{GP}$ IGPk" should be -- to be distributed over the $N_{IGP}$ IGPk --.

In Claim 3, Column 47, Line 23, "matrix of rank NIGP, defined by:" should be -- matrix of rank $N_{IGP}$, defined by: --.

In Claim 3, Column 47, Line 34, "Student's factor the lGPk" should be -- Student's factor the IGPk --.

In Claim 4, Column 48, Line 13, "to be distributed over the Map IGPk" should be -- to be distributed over the $N_{IGP}$ IGPk --.

In Claim 4, Column 48, Line 14, "considered comprises NIGP IGP" should be -- considered comprises $N_{IGP}$ IGP --.

In Claim 4, Column 48, Line 41, "Student's factor the lGPk" should be -- Student's factor the IGPk --.

In Claim 5, Column 49, Line 23, "to be distributed over the NIGP IGPk when the mesh cell of the IPPi considered comprises NIGP IGP," should be -- to be distributed over the $N_{IGP}$ IGPk when the mesh cell of the IPPi considered comprises $N_{IGP}$ IGP, --.

Signed and Sealed this
Second Day of November, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,859,707 B2

In Claim 8, Column 52, Line 46, "a row vector with NIGP components" should be -- a row vector with $N_{IGP}$ components --.

In Claim 8, Column 52, Line 61, "designates a column vector with NIGP components of the distribution of the square $Res_i^2$ of the residual $Res_i$ to be distributed over the NIGP IGPk when the mesh cell" should be -- designates a column vector with $N_{IGP}$ components of the distribution of the square $Res_i^2$ of the residual $Res_i$ to be distributed over the $N_{IGP}$ IGPk when the mesh cell --.

In Claim 9, Column 54, Line 1, "P designates the diagonal matrix of weights and $$P = \begin{bmatrix} \frac{1}{p_1} & \cdots & 0 \\ \vdots & \ddots & \vdots \\ 0 & \cdots & \frac{1}{p_{N_{IGP}}} \end{bmatrix},$$

X designates the column vector of residuals:

$$X = \begin{bmatrix} \Delta_{Res_1}^2 \\ \vdots \\ \Delta_{Res_{N_{IGP}}}^2 \end{bmatrix}$$ " should be -- P designates the diagonal matrix of weights $$P = \begin{bmatrix} \frac{1}{p_1} & \cdots & 0 \\ \vdots & \ddots & \vdots \\ 0 & \cdots & \frac{1}{p_{N_{IGP}}} \end{bmatrix},$$ and X designates the Column vector of residuals: $$X = \begin{bmatrix} \Delta_{Res_1}^2 \\ \vdots \\ \Delta_{Res_{N_{IGP}}}^2 \end{bmatrix}$$ --.

In Claim 11, Column 55, Line 25, "for each lGPk of the second set," should be -- for each IGPk of the second set --.

In Claim 11, Column 55, Line 43, "Student's factor the lGPk" should be -- Student's factor the IGPk --.

In Claim 12, Column 57, Line 42, "a residual for the lGP concerned" should be -- a residual for the IGP concerned --.

In Claim 13, Column 57, Line 51, "for each lGPk of the second set" should be -- for each IGPk of the second set --.

In Claim 13, Column 58, Line 2, "Student's factor the lGPk" should be -- Student's factor the IGPk --.

In Claim 15, Column 59, Line 39, "designates a column vector with NIGP components," should be -- designates a column vector with $N_{IGP}$ components --.

CERTIFICATE OF CORRECTION (continued)
U.S. Pat. No. 10,859,707 B2

In Claim 15, Column 59, Line 41, "to be distributed over the NIGP IGPk" should be -- to be distributed over the $N_{IGP}$ IGPk --.

In Claim 15, Column 59, Line 43, "considered comprises NIGP IGP," should be -- considered comprises $N_{IGP}$ IGP, --.